US007730014B2

(12) United States Patent
Hartenstein et al.

(10) Patent No.: US 7,730,014 B2
(45) Date of Patent: Jun. 1, 2010

(54) SYSTEMS AND METHODS FOR MANAGING AFFILIATIONS

(76) Inventors: Mark A. Hartenstein, P.O. Box 1066, Boise, ID (US) 83701; Nicholas M Roosevelt, 1811 Marin Ave., Berkeley, CA (US) 94707

( * ) Notice: Subject to any disclaimer, the term of this patent is extended or adjusted under 35 U.S.C. 154(b) by 0 days.

(21) Appl. No.: 10/811,327

(22) Filed: Mar. 25, 2004

(65) Prior Publication Data

US 2005/0192822 A1    Sep. 1, 2005

Related U.S. Application Data

(60) Provisional application No. 60/457,839, filed on Mar. 25, 2003.

(51) Int. Cl.
*G06F 17/30*    (2006.01)

(52) U.S. Cl. ............................ 707/102; 707/3; 707/4; 707/5; 707/100; 705/7; 705/8; 705/9

(58) Field of Classification Search ................ 707/1–3, 707/9–10, 100, 102, 104.1, 200; 705/7–9, 705/1, 5; 709/217–220, 225–229; 715/530, 715/963, 853, 751; 379/88.17, 88.22, 88.25
See application file for complete search history.

(56) References Cited

U.S. PATENT DOCUMENTS

| | | | |
|---|---|---|---|
| 5,557,746 A | 9/1996 | Chen | 709/202 |
| 5,960,406 A | 9/1999 | Rasansky | 705/9 |
| 5,991,742 A | 11/1999 | Tran | 705/32 |
| 5,999,938 A | 12/1999 | Bliss | 707/102 |

(Continued)

FOREIGN PATENT DOCUMENTS

WO    WO 01/63402    *    8/2001

(Continued)

OTHER PUBLICATIONS

Abeta, A et al. "operation record based work events grouping method for personal information management system", procedings twenty second annual international. computer software and applications conference, 1998, pp. 548-555.*

(Continued)

*Primary Examiner*—Khanh B Pham

(57) ABSTRACT

An affiliation manager provides each of typically hundreds of users with a calendar of appointments and a task list each including icons for capturing time and expenses accrued by the user when attending a particular appointment or performing a particular task. A subset of collected captured time and expenses may be transferred to each requesting client for use by independent accounting systems. Management of appointments and tasks from a central database promotes collaboration among users, simplifies sharing of schedule information among users, and provides context for data entry. Each user may create any number of affiliations, each affiliation describing affiliations of the user in numerous projects, organizations, employments, and activities. Each user may admit other users to share his or her affiliations, thereby promoting collaboration of many users for jointly attending meetings and jointly performing tasks. Context permits automatic intuitive association of email, chat messages, notes, and documents to records for persons, locations, resources, appointments, tasks, and projects for integrated affiliation management services. Requests for queries and forms are interpreted according to the context in which the user issued the request. Requests are made via a common set of icons and links on each item of a list provided by a prior query.

6 Claims, 13 Drawing Sheets

U.S. PATENT DOCUMENTS

| | | | |
|---|---|---|---|
| 6,064,977 A | 5/2000 | Haverstock | 705/9 |
| 6,363,352 B1 | 3/2002 | Dailey | |
| 6,369,840 B1 * | 4/2002 | Barnett et al. | 715/853 |
| 6,380,959 B1 | 4/2002 | Wang | 715/853 |
| 6,424,995 B1 * | 7/2002 | Shuman | 709/206 |
| 6,442,567 B1 | 8/2002 | Retallick | 707/104.1 |
| 6,457,062 B1 | 9/2002 | Pivowar | |
| 6,466,236 B1 | 10/2002 | Pivowar | |
| 6,480,830 B1 | 11/2002 | Ford | 705/9 |
| 6,768,788 B1 * | 7/2004 | Langseth et al. | 379/67.1 |
| 6,785,868 B1 | 8/2004 | Raff | |
| 6,925,458 B2 * | 8/2005 | Scaturro et al. | 707/3 |
| 7,039,596 B1 * | 5/2006 | Lu | 705/8 |
| 2001/0014866 A1 | 8/2001 | Conmy | 705/9 |
| 2001/0014867 A1 | 8/2001 | Conmy | 705/9 |
| 2002/0023132 A1 | 2/2002 | Tornabene | 709/205 |
| 2002/0032588 A1 | 3/2002 | Glazer | 705/6 |
| 2002/0035728 A1 | 3/2002 | Fries | 728/68 |
| 2002/0038234 A1 * | 3/2002 | Fu et al. | 705/8 |
| 2002/0042838 A1 | 4/2002 | Tabayoyon | 709/237 |
| 2002/0147661 A1 | 10/2002 | Hatakama | 705/26 |
| 2003/0023463 A1 * | 1/2003 | Dombroski et al. | 705/5 |
| 2003/0088536 A1 * | 5/2003 | Behnia | 707/1 |
| 2003/0129569 A1 | 7/2003 | Callaway | |
| 2003/0135565 A1 * | 7/2003 | Estrada | 709/206 |
| 2003/0169695 A1 * | 9/2003 | Salo et al. | 370/264 |
| 2003/0220823 A1 * | 11/2003 | Sartorius et al. | 705/8 |
| 2004/0003042 A1 * | 1/2004 | Horvitz et al. | 709/204 |
| 2004/0174392 A1 * | 9/2004 | Bjoernsen et al. | 345/751 |
| 2004/0186758 A1 * | 9/2004 | Halac et al. | 705/7 |
| 2004/0224675 A1 * | 11/2004 | Puskoor et al. | 455/419 |
| 2005/0049903 A1 * | 3/2005 | Raja | 705/7 |

FOREIGN PATENT DOCUMENTS

| WO | WO 2004056137 | * | 7/2004 |
|---|---|---|---|

OTHER PUBLICATIONS

Chandy K. Mani, "A World-Wide Distributed System Using Java and the Internet", Mar. 8, 1996, pp. 1-10.

"Trash Your Desktop", Fitzgerald, MIT Technology Review, Oct. 20, 2003, http://www.matr.net/print_8477.html.

* cited by examiner

SYSTEMS AND METHODS FOR MANAGING AFFILIATIONS

CROSS-REFERENCE TO RELATED APPLICATIONS

This application claims priority to provisional patent application Ser. No. 60/457,839 filed Mar. 25, 2003 by Mark Hartenstein, et al.

FIELD OF THE INVENTION

The present invention relates to systems and methods for managing many aspects of a person's or an organization's affiliations for improving collaboration among persons and organizations having similar affiliations.

BACKGROUND OF THE INVENTION

Many individuals use their limited time and financial resources to participate in several activities including employments, family life, charitable functions, sports, and social events. When more than one person is involved in the same activity, collaboration may be used to advantage to achieve a commonly desired goal. However, collaboration may be hindered by differences between the individual's intentions and commitments of time and financial resources. For example, individuals may not be able to meet together because prior time commitments by one or more of the individuals leave no open common time for a meeting.

Conventional systems include computer programs that present a personal appointment calendar. In some conventional systems, a user can divide appointments into groups and view a separate calendar presentation for each group of appointments. For example, one group of appointments may relate to the user's membership in a bridge club; while another group of appointments may relate to a program of personal physical fitness. These systems may include a calendar presentation of all appointments from all groups to enable the user to plan an activity in an uncommitted time period.

Use of conventional systems leaves unsolved problems. It remains difficult for many individuals to share information sufficient to effectively and economically collaborate, each one collaborating with different individuals in different spheres of their lives. Further, the costs of collaboration cannot be easily monitored. Conventional systems require time and expenses to be captured on systems separate from the system that presents and maintains each personal calendar. In particular, conventional systems for personal appointment calendars lack the capability to uniformly capture time and expense information from all individuals involved in collaborative activities and to enable separate accounting systems to prepare bills for payment of the associated fees and expenses.

Systems and methods of the present invention reduce the cost of collaboration. By making collaboration easier to manage for each individual, emotional and physical stresses on collaborating individuals are also reduced.

SUMMARY OF THE INVENTION

A method for affiliation management, according to various aspects of the present invention, includes, in any order: (a) providing a store including: a first plurality of records each describing a respective person; a second plurality of records wherein each record of the second plurality describes a respective item including at least one of a task and an appointment; and indicia of associations between records of the first plurality and records of the second plurality to associate at least one of attendees to appointments and assignees to tasks; (b) managing user sessions, each user session identified to a respective person of the first plurality of records; (c) providing a first presentation in a first user session identified to a first person, the first presentation including field values of records selected from the first plurality and the second plurality in accordance with a first affiliation; (d) providing a control in the first user session; (e) creating a second affiliation in response to operation of the control; and (f) providing a second presentation in accordance with the second affiliation in a second user session identified to a second person.

Another method for affiliation management, according to various aspects of the present invention, includes, in any order: (a) providing a store including: a first plurality of records each describing a respective person; a second plurality of records wherein each record of the second plurality describes a respective item including at least one of a task and an appointment; first indicia of associations between records of the first plurality and records of the second plurality to associate at least one of attendees to appointments and assignees to tasks; a third plurality of records each describing a charge of at least one of a time period and an expense; and second indicia of associations between records of the first plurality, records of the second plurality, and records of the third plurality; (b) managing user sessions, each user session identified to a respective person of the first plurality of records; (c) providing in a first user session identified to a first person: a first presentation including field values of records selected from the first plurality and the second plurality; a first control; and a second control; (d) creating a record of the third plurality in response to user operation of the first control; (e) receiving a request in response to user operation of the second control, the request including indicia of criteria; and (f) downloading in a format for accounting a multiplicity of field values of records of the third plurality of records in accordance with the criteria.

Yet another method for affiliation management, according to various aspects of the present invention, includes, in any order: (a) providing a store including: a first plurality of records each describing a respective person; a second plurality of records wherein each record of the second plurality describes a respective item including at least one of a task and an appointment; and indicia of associations between records of the first plurality and records of the second plurality to associate at least one of attendees to appointments and assignees to tasks; (b) managing user sessions, each user session identified to a respective person of the first plurality of records; (c) providing a first presentation in a first user session identified to a first person, the first presentation including a first multiplicity of field values of records selected from the first plurality and the second plurality in accordance with a first affiliation; and (d) providing a second presentation in a second user session identified to a second person, the second presentation including a second multiplicity of field values of records selected from the first plurality and the second plurality in accordance with a second affiliation; wherein the second multiplicity includes at least one field value of the first multiplicity and at least one field value not of the first multiplicity.

Still another method for affiliation management, according to various aspects of the present invention, includes, in any order: (a) providing a store including: a first plurality of records each describing a respective person; a second plurality of records wherein each record of the second plurality describes a respective item including at least one of a task and an appointment; and indicia of associations between records of the first plurality and records of the second plurality to associate at least one of attendees to appointments and assignees to tasks; (b) managing user sessions, each user session identified to a respective person of the first plurality of records; (c) providing presentations in a first user session identified to a first person, providing being in accordance with a first affiliation, the first affiliation including criteria for selection of field values and records of the first plurality and the second plurality; (d) providing a control in the first user session for beginning a chat session; and (e) providing a list of persons identified to other user sessions selected from records of the first plurality in accordance with the criteria of the first affiliation.

And, another method for affiliation management, according to various aspects of the present invention, includes, in any order: (a) providing a store including: a first plurality of records each describing a respective person; a second plurality of records wherein each record of the second plurality describes a respective item including at least one of a task and an appointment; and indicia of associations between records of the first plurality and records of the second plurality to associate at least one of attendees to appointments and assignees to tasks; (b) providing a first presentation, the first presentation including field values of records selected from the first plurality and the second plurality in accordance with a first affiliation and a first aggregation; (c) receiving a request to edit a field value of a record of the store thereby creating a modified field value; and (d) providing a control including a list of alternate aggregations for user activation in place of the first aggregation, the list including a particular aggregation operative in accordance with the modified field value.

A store according to various aspects of the present invention includes: a first plurality of records each describing a respective person; a second plurality of records wherein each record of the second plurality describes a respective item including at least one of a task and an appointment; indicia of associations between records of the first plurality and records of the second plurality to associate at least one of attendees to appointments and assignees to tasks; a third plurality of records each describing a note; indicia of associations between records of the third plurality and at least one of records the first plurality and records of the second plurality; and indicia of subject for associating records of the first plurality, the second plurality, and the third plurality, each respective association in accordance with a common subject.

Another method performed by a server according to various aspects of the present invention facilitates communicating among users. The method includes providing a list of items to any particular user; and accepting input from the particular user. In the list of items, each item is of a common type, the common type being of a set of types including a contact, an appointment, and a task; and each item is associated with a respective set of controls. In the sets of controls, each respective set of controls comprises respective controls of common appearance as respective controls of each other set of controls; and each respective control of each set, when activated by a user, performs a function in accordance with the item to which it is associated. The input is responsive to activation by the user of a particular control to facilitate at least one of the creation of a new item, accessing a created item, and accessing a second list of created items. The second list is also prepared according to this method. In another implementation, the control comprises an icon having a multiplicity of appearances, each appearance conveying a status of a second item that is accessible via activation of the icon.

A system for affiliation management, according to various aspects of the present invention includes an engine for performing any of the methods discussed above. The engine may include any combination of hardware, firmware, software, memory devices, communication circuitry, and processing circuitry.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
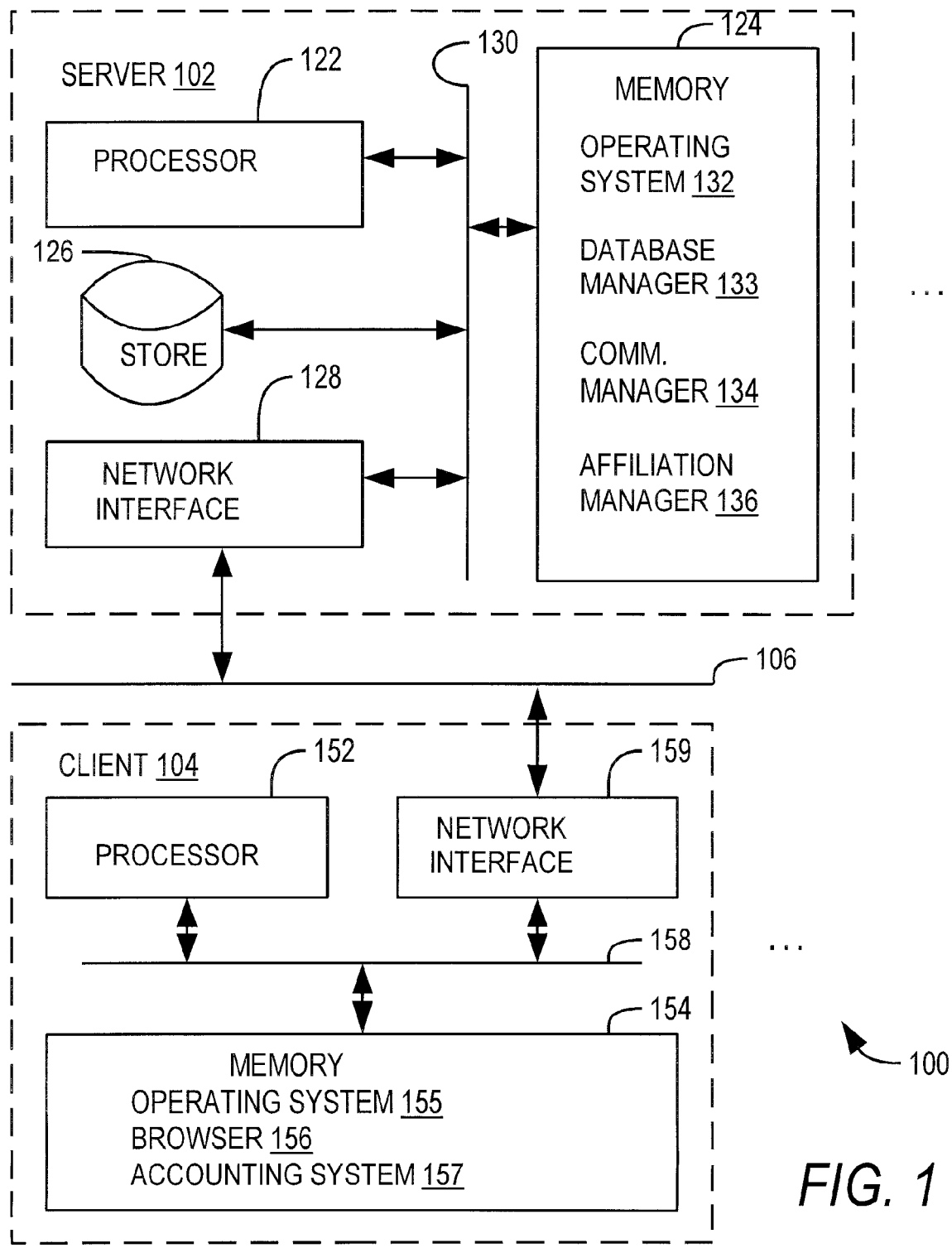
FIG. 1 is a functional block diagram of a system according to various aspects of the present invention.

Generally, an affiliate is a person who has associated himself or herself with one or more other affiliates. The association may be an employment, membership, social relationship, or economic relationship. Typically, the association begins on the mutual recognition by the person and other affiliates of a mutual intention to cooperate; often accompanied by an exchange of commitments (e.g., promises) related to cooperation. Employment, membership, social relationship, and economic relationship are synonymous with affiliation as used herein. Variants such as employee, member, husband, share holder, partner, and associate are synonymous with affiliate as used herein.

An affiliation manager, according to various aspects of the present invention (e.g., FIGS. 1-13), includes any system for reducing the risk of conflicting intentions, commitments, and/or activities. Conflict may arise from physical limitations (e.g., a person cannot simultaneously be in more than one place at one time), information sharing limitations (e.g., a person risks breach of confidences when simultaneously involved in two conversations or activities), and limitations on resources (e.g., limited budget for expenses; or limited access to a material object). An affiliate may experience conflict among his or her own intentions and commitments. From another point of view, one affiliation may experience conflict with another affiliation when in competition (knowing or unknowing) for a limited resource. As a result of using an affiliation manager, according to various aspects of the present invention, the risk of conflict may also be reduced by providing more effective access to information. By simplifying access, communication between affiliates is more likely to be an effective mechanism for avoiding forming intentions and/or making commitments that are or will be conflicting.

An affiliation manager may collect information for use by one or more independent accounting systems. Alternatively, a centralized accounting system may be part of the affiliation manager. Accounting may include capturing information near in time to when some time was spent or an expense was incurred. Timely capture generally assures accuracy. Captured information may include the date and duration of the time spent, the date and amount of expenses, and the name of the person(s) who spent time and incurred expenses. The functions of the accounting system may further include accumulating captured amounts in budget categories, comparing accumulated amounts to planned amounts, and preparing statements of account (e.g., bills, histories, or projections). According to various aspects of the present invention, predetermined subsets of captured and collected information may be transferred periodically (e.g., on request) to any independent accounting system.

The functions of an affiliation manager may be implemented in any suitable information processing system that receives commitments made by each affiliate, and presents information about relevant existing commitments to an affiliate to assist the affiliate in making a new commitment with reduced risk of conflict. An affiliate may also obtain and consider information provided about existing commitments to enable more effective use of the affiliate's time and resources, perhaps according to one or more budget plans. For example, if an affiliate, on review of available time, sees that he has not spent as much time as desired with another affiliate, the affiliation manager may enable communication so as to facilitate the two affiliates spending a portion of each affiliate's time for a particular purpose. For example, the affiliation manager may provide reminders to an affiliate in response to detecting lapse of a predetermined period of time, lapse of time since a last suitable collaborative activity, or reminders in advance of a collaborative activity to promote thorough preparation by each affiliate.

Data structures and methods according to various aspects of the present invention may be implemented using any of several well known information system architectures, including the client-server model (e.g., having thin clients), the temporary off-line model (e.g., having "stand-alone" clients), and the distributed replicas model (e.g., having fat clients). In a first architecture, a centralized data store serves as a sole authority for information regarding intentions, commitments, and communications among affiliates. Each affiliate uses a terminal or personal computer to request information from the server and the store and to obtain presentations of such information, where the presentations may be prepared to any suitable extent by the server and/or the terminal or personal computer. In a second architecture, the central store is physically distributed among servers and mirrors of the store to improve responsiveness to requests for information. In both the first and second architectures, the central store is maintained by a conventional computer system called a server and each affiliate operates a conventional computer system called a client. Multiple servers share information regarding replica synchronization via any conventional network. Each client is coupled to a server by any conventional network link.

In the temporary off-line model, the affiliate's computer system may be out of network communication with all servers temporarily. During the hiatus in communication, a replica of relevant portions of the store is maintained on the affiliate's computer system to enable review of information (albeit not up to date) and to enable entry of information (albeit not available to other affiliates). When communication is restored, the central store (and any extant replicas) may be synchronized prior to further operation in the client-server model.

In a distributed replicas architecture, no central store serves as a sole authority. Instead, information is continuously maintained in synchronized replicas that exist, one on each client computer system. Synchronization may be effectively continuous, as when all clients are on-line to a common network; or, discontinuous to any suitable extent. For example, where network communication may be expensive, synchronization may occur less than once a day.

Synchronization of replicas as discussed above may be accomplished with any conventional distributed storage technology or by custom email messages between clients capable of automatically parsing the email received and making suitable changes to records of the local replica.

An affiliation management system according to the client-server models discussed above having thin clients may include a server, a network, and any number of thin clients coupled to the network. For example, system 100 of FIGS. 1-13 includes server 102, client 104, and network 106. Server 102 represents one of possibly many servers operated from time to time by a respective system administrator and cooperating to respond to client requests. Client 104 represents one of many clients independently operated from time to time by a respective affiliate (herein also called a user). Server 102 and client 104 each include a conventional processor (122, 152), memory (124, 154), network interface (128, 156), and internal bus (130, 158) respectively coupling the processor, memory and network interface, all implemented with conventional technologies. Though the functions are similar in client and server, the data throughput at the server (e.g., for 10,000 clients) is supported with conventional technologies different from the generally low-cost conventional technologies used for each client. Any configuration of conventional memory devices and subsystems (e.g., semiconductor memory, rotating magnetic or optical storage, cache, RAID subsystems, or mirrored subsystems) may be used for server 102 and/or client 104. Network 106 may be implemented with any combination of conventional network technologies including wired and wireless local area networks and, preferably the Internet.

Server 102 includes store 126 comprising a sole authority database for affiliation management. Any conventional database storage mechanism may be used, such as a combination of memory devices discussed above. Store 126 may also be implemented with conventional storage area network (SAN) technologies and/or a network of servers supporting a conventional distributed data storage architecture, such as Active Directory, marketed by Microsoft Corporation.

Server memory 124 includes operating system 132, database manager 133, communication manager 134 (e.g., for operation as a web server on the Internet), and affiliation manager 136 comprising instructions for methods of affiliation management according to various aspects of the present invention.

Client memory 154 further includes operating system 155, browser 156, and accounting system 157. As discussed above, affiliation manager 136 captures and collects billable time (fees) and disbursements (expenses) and transfers that information to client 104 for use by accounting system 157. Accounting system 157 may automatically receive and organize any suitable subset of the captured and collected information and periodically issue suitable bills to responsible persons. Accounting system 157 may further manage accounts payable, accounts receivable, and a general ledger in any conventional manner.

A method for affiliation management may be implemented using any single or multi-threaded, single or multi-tasking operating system. For example, operating systems 132 and 155 may each support an application program for affiliation management. As shown, operating system 132 hosts an application program, the affiliation manager 136; and, operating system 155 supports a general purpose application program, browser 156.

Figure 2:
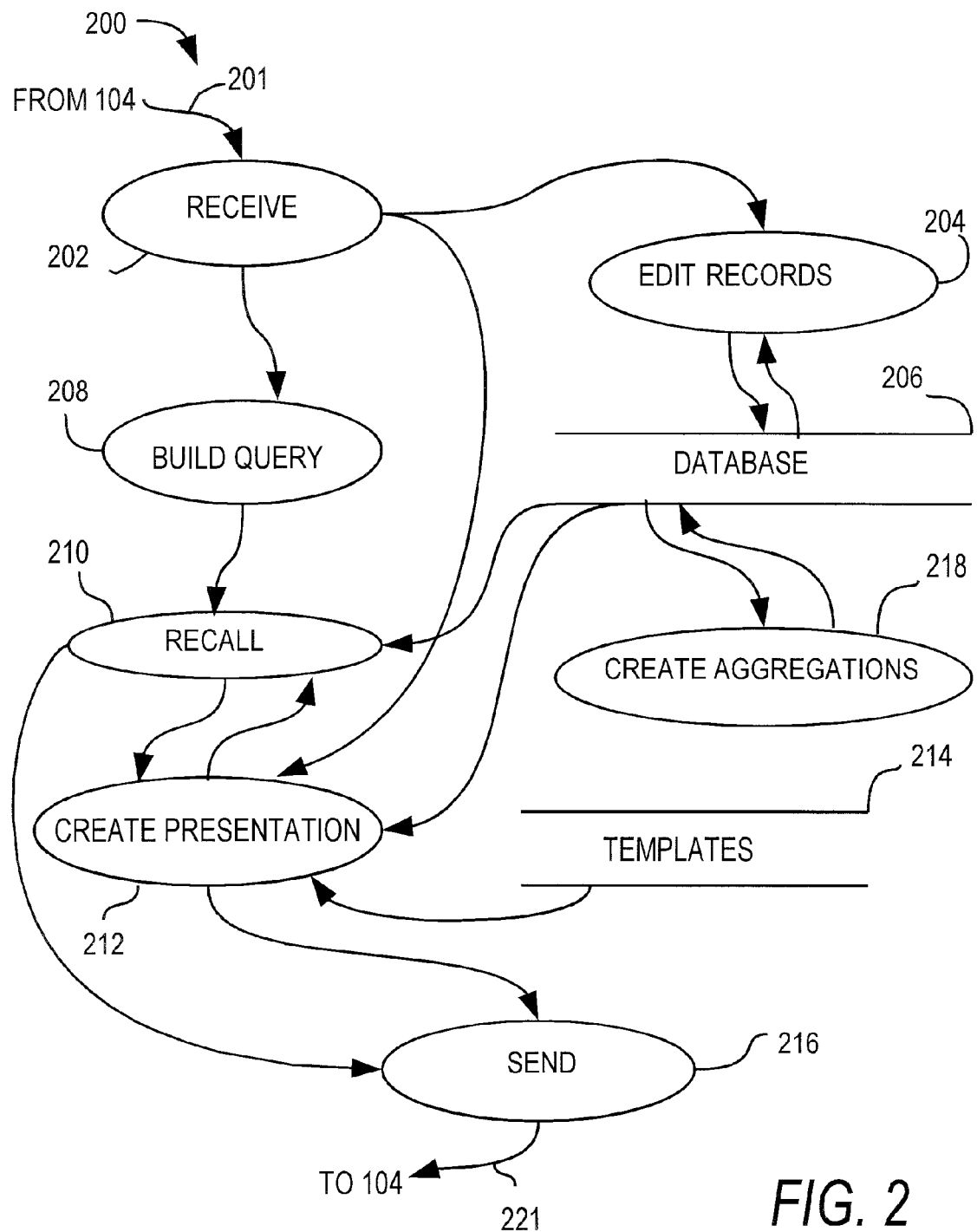
FIG. 2 is a data flow diagram of a process for managing affiliations performed by the system of FIG. 1.
Figure 3:
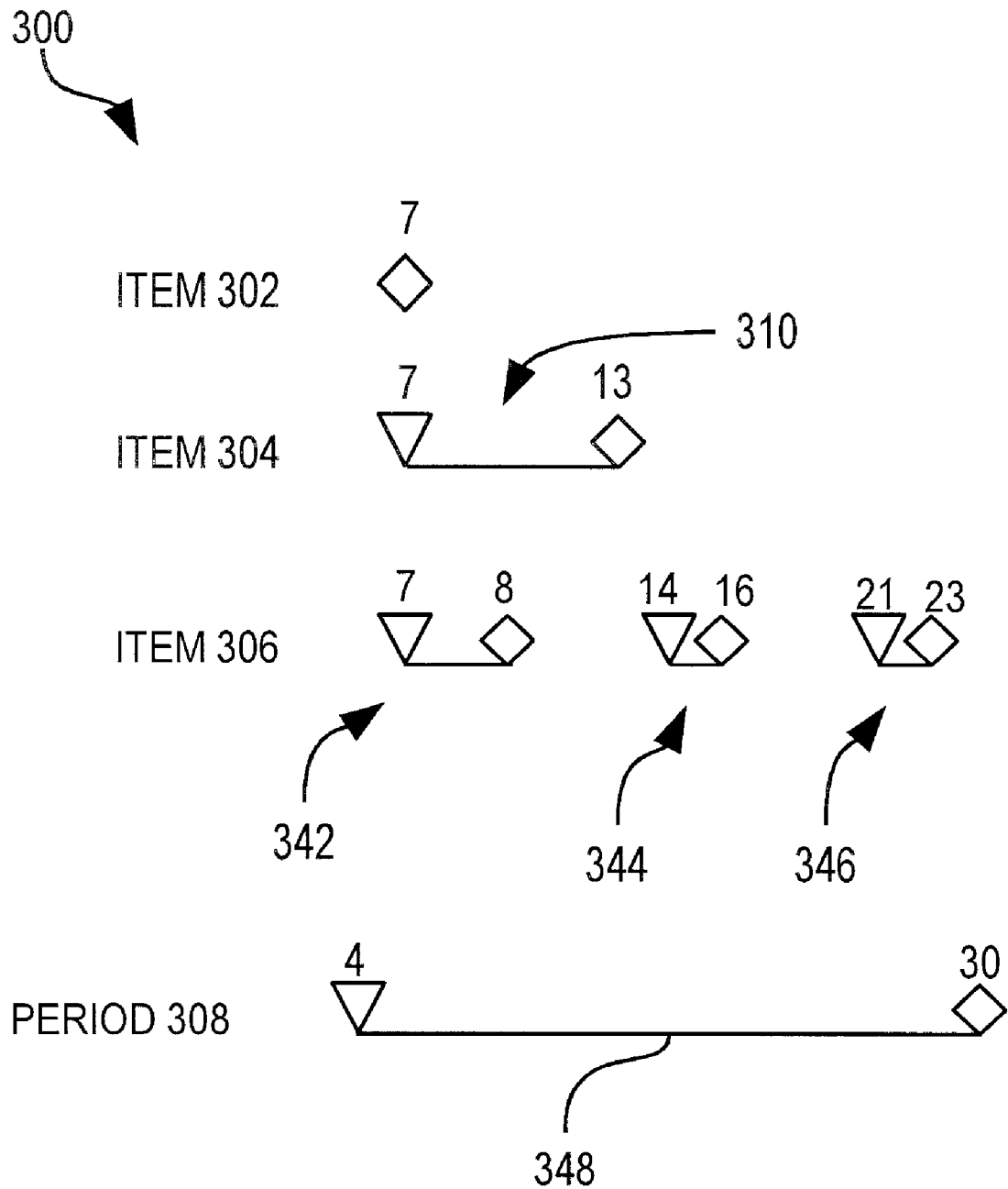
FIG. 3 is a schedule of items according to various aspects of the present invention.
Figure 4:
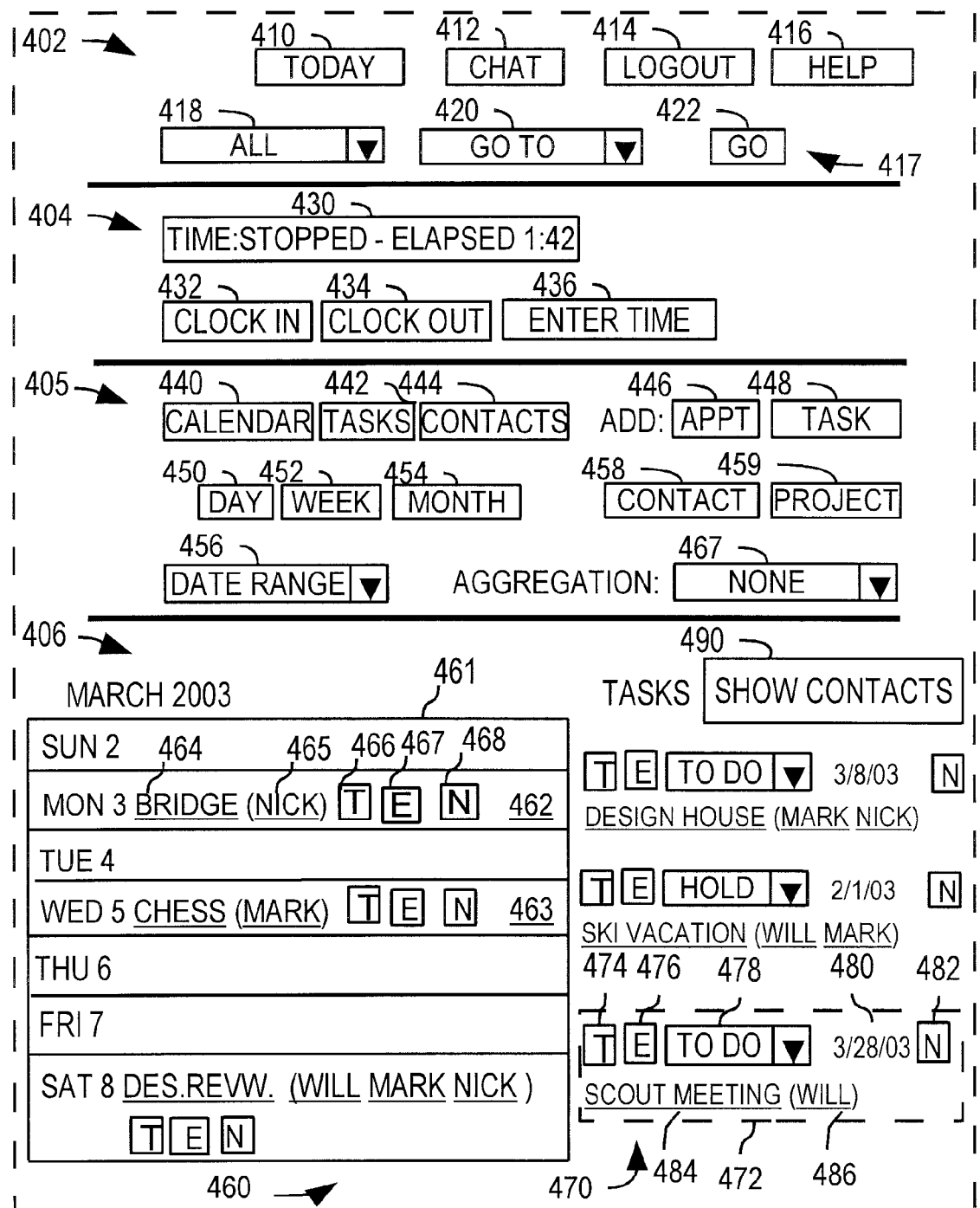
FIG. 4 is a presentation of a calendar and task list provided by the process of FIG. 2.
Figure 5:
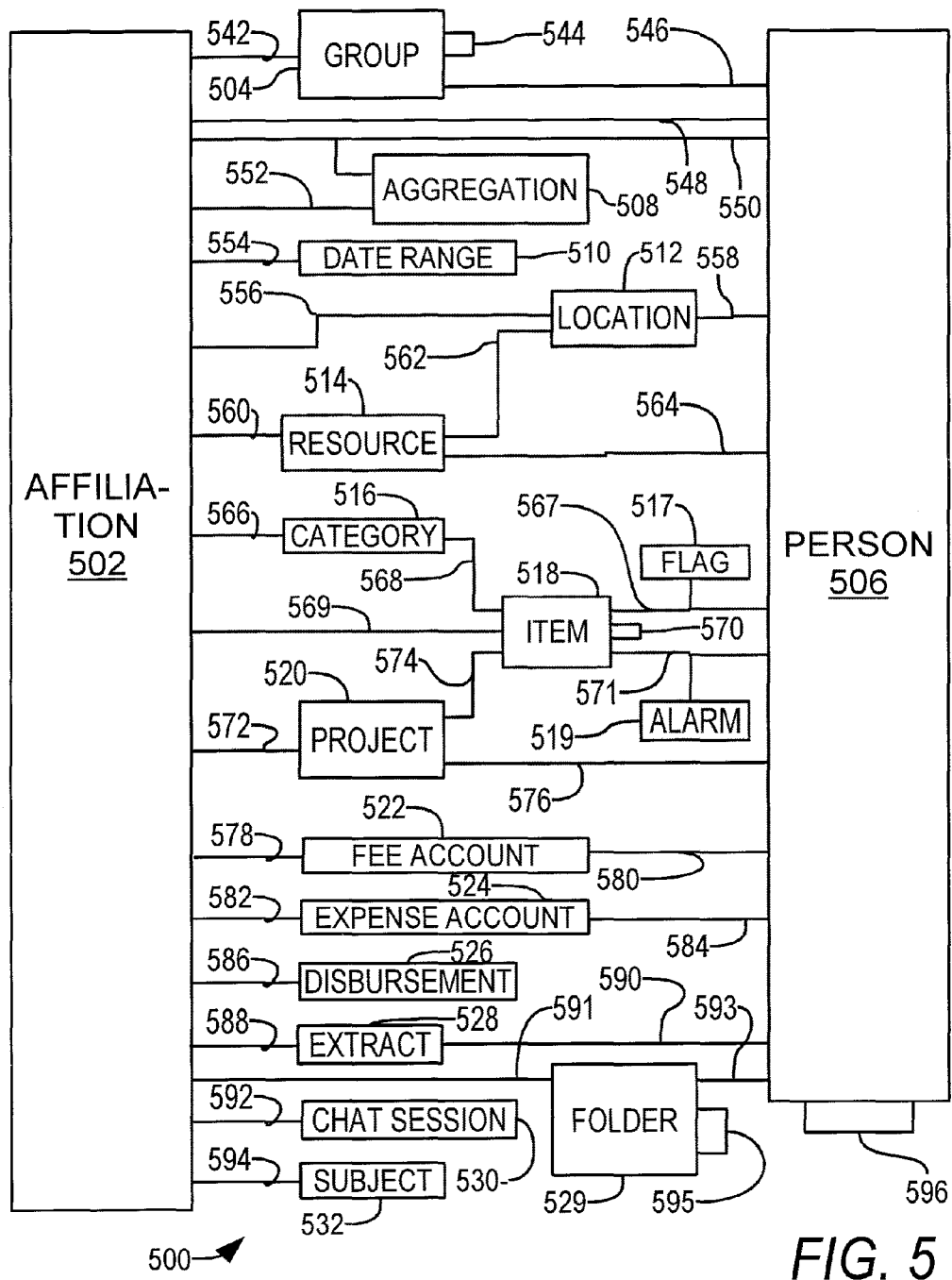
FIGS. 5-11 form an entity relationship diagram of the database of FIG. 2.
Figure 6:
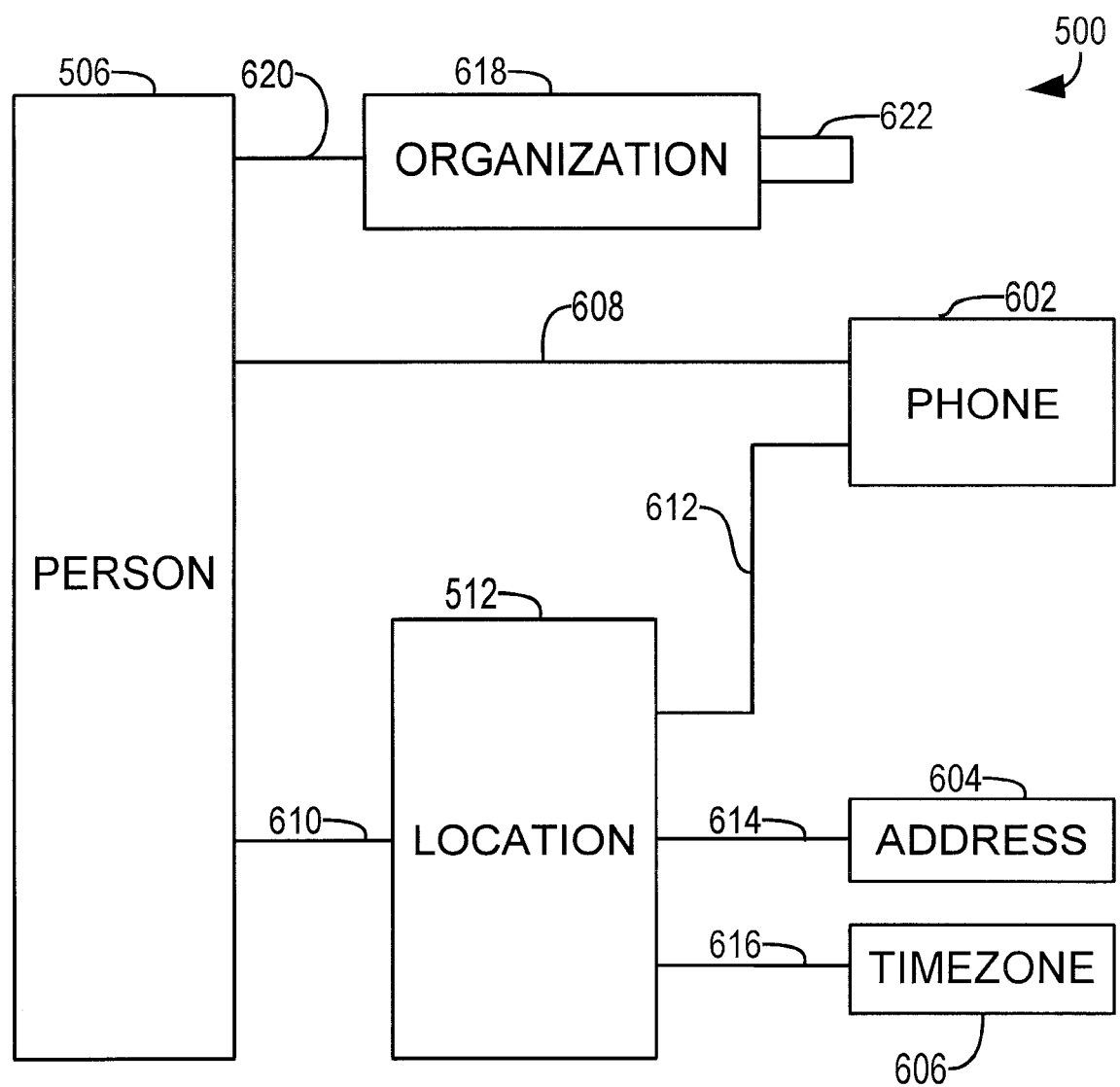

Affiliation manager 136 may include engine 200 of FIG. 2 for performing cooperating processes, each process performing its functions when sufficient data becomes available. Interprocess communication may be implemented in any conventional manner. Engine 200 may be implemented in any combination of hardware and software.

Engine 200 includes receive process 202, edit records process 204, database 206, build query process 208, recall process 210, create presentation process 212, templates 214, send process 216, and create aggregations process 218. Receive process 202 drives network interface 128 to receive requests 201 for information from client 104 via communication over network 106 and operation of communication manager 134 (assisted by operating system 132). Request 201 may be the result of an affiliate indicating via browser 156 to follow a hypertext link or indicating that a form is to be submitted via an hypertext transfer protocol (HTTP) "post" command. Receive process 202, in any order, (a) parses request 201; (b) determines whether records of database 206 might be added, deleted, or modified as a consequence of request 201 and if so passes information to edit records process 204; (c) determines whether one or more queries are needed prior to creating a response presentation, and if so passes information to build query process 208; and (d) indicates that a presentation is to be created (possibly to include query results) by passing information to create presentation process 212 (e.g., a uniform resource locator (URL) of a page identified in a hypertext link).

Database 206 includes tables comprising records. Each record comprises fields. Each field may have a value. As such, a record implements an association among field values. And, a table implements an association among records. A table may include one or more fields (e.g., keys) whose values are indexed to facilitate access to records of the table. A table, a record, or an index may implement a data structure having an association among field values. Data structures according to various aspects of the present invention facilitate affiliation management functions discussed above and performed by engine 200.

Edit records process 204 may be accomplished by database manager 133. For example, information received from receive process 202 may conform to conventional Sequential Query Language (SQL). Edit records process determines whether the edits requested are permissible by recalling from database 206 conventional access privileges associated with the session and the affiliate identified with the request received from client 104. Access privileges may be implemented with aggregations discussed below. Effecting an edit may include an add, delete, or modify to one or more records of one or more tables of database 206 with consequent updates of indexes. Any of such acts on database 206 may satisfy criteria for a trigger to create presentation process 212, create aggregations process 218, or further operations by edit records process 204 in any conventional manner.

Recall process 210 obtains data from one or more records of one or more tables of database 206 as directed by information received from build query process 208. Recall process may obtain further data from database 206 at the request of create presentation process 212.

Create presentation process 212 builds one or a sequence of messages to be delivered via the network to client 104 in response to request 201. Create presentation process 212 also composes records, reports, files, and streams (e.g., audio and video) for downloading to client 104. Messages may comprise or enable composition of one or more so called web pages by browser 156. Typically, such web pages include one or more templates from store 214 filled in with information recalled by process 210 and obtained from database 206. A template may include text, graphics, and presentation control instructions (e.g., cascading style sheets) for platform independent presentation (e.g., using extended markup language (XML) or hypertext markup language (HTML)). Generally, the set of all pages possible to be presented to a user is called a site or web site. In an implementation for the Internet, affiliation manager 136 is the host of an affiliation management web site.

Send process 216 receives information from create presentation process 212 and drives network interface 128 (assisted by communication manager 134 and operating system 132) to transfer information 221 to client 104 via network 106. Information may be transferred for use by browser 156 or by any email receiving program (not shown). Any conventional protocol may be used including, for example, HTTP or SMTP (for email delivery). Send process 216 packages the information received from create presentation process 212 for suitable delivery and manages (assisted by communication manager 134) failure/retry to assure proper delivery.

Create aggregations process 218 edits records of database 206 to assure the integrity, security, and authenticity of data stored in database 206. An aggregation is a group of records deemed accessible for a particular database operation such as read, modify, or delete. By creating an aggregation and associating the aggregation with an affiliate, the affiliate has limited access to database 206 promoting security of data not included in the aggregation, yet permitting suitable access for the affiliate, for example, to revise data of which he or she is the author. According to various aspects of the present invention, various custom aggregations are created in response to triggers as discussed above. These custom aggregations facilitate, among other things, communication among affiliates so to reduce the risk of conflict as discussed above.

When an affiliate describes an entity (e.g., creates a record for an affiliation, a person, or a project), an aggregation named for that entity may be created by create aggregations process 218. Other elements of the created aggregation (e.g., limitations or query criteria) may be included in the created aggregation. These limitations may be derived from the current session context (e.g., the historical sequence of provided presentations and the currently provided presentation). A presentation provides a context so to speak because field values of records used to prepare the presentation constitute a context. Affiliation manager 136 adds the named aggregation to any graphical user interface control to simplify further user navigation of affiliation information. The provided named aggregations are more intuitive and functionally replace general purpose forms for entry of query criteria.

An affiliate may indicate an intention to commit or commit to an item managed by an affiliation manager. An item may include an appointment, a task, an expenditure, and/or a use of any resource. Information about the item may be presented in a list (e.g., a task list). If an item is associated with a date and/or time of day, the affiliation manager may present information about the item using any conventional schedule or calendar format. For example, schedule 300 shown as a Gantt chart in FIG. 3 includes item 302, item 304, item 306, and period 308 modeled in database 206 for management by affiliation manager 136. An item may be associated with a single date and time (e.g., item 302), a period of time (e.g., item 304), or a plurality of periods of time (e.g., item 306). Time of day may be included with any date, for example, 9:12 AM PST. Item 302 occurs on the 2nd of the month representing, for instance, a meeting date, a delivery date, an inception date, or a due date. Item 304 occurs during one period of time 310 beginning on the 7th of a month and ending on the 13th of that month. The period may be a shortest time, a likely completion time, a longest time, or an average of these (e.g., for conventional PERT analysis). In one implementation, attributes of item 304 include a start date and time (the 7th), an end date and time (the 13th), and a duration of seven days. Item 306 has a recurring schedule. Item 306 has three occurrences during period 308 from the 4th of the month to the 30th of the month. Attributes of item 306 may include a date range during which repeated occurrences may be scheduled (e.g., automatically by affiliation manager 136 or manually by an affiliate). This date range, also called a repeat period, is shown as period 308 having a start at the 4th of the month and a finish at the 30th of the month. During period 308, three regularly spaced occurrences (342, 344, and 346) of item 306 have been scheduled. Attributes of item 306 may further include a duration for each occurrence (e.g., 1 day as shown for each of 342, 344, and 346), and an offset between respective occurrence start dates (e.g., 7 days as shown).

Scheduled periods associated with an item are herein called ItemDates. Other information that may be associated with a particular ItemDate includes persons and expenses. For example, different persons and different expenses may be uniquely associated with different ItemDates of the same item. ItemDates facilitate accurate accounting for time and expenses for the purposes discussed above.

An affiliation manager may present information employing any conventional features of a graphical user interface (GUI). For example, create presentation process 212 prepares presentations having any mix of features supported by browser 156. A typical GUI includes a pointing device (e.g., a mouse) for the user to specify commands in an ad hoc manner. Such commands are typically activated by operating the mouse over a so-called button of the presentation. Buttons may be organized in regions of the presentation. Text entry may be accomplished via a keyboard and a text entry box of the presentation. Information entry may be by text and/or facilitated by a drop down menu having suggested information. The combination of a text entry box and a drop down menu is called a text-menu box.

For example, presentation 400 includes regions 402, 404, 405, and 406. Region 402 generally includes buttons for control of the user's session and major changes of context. Region 402 includes Today button 410, Chat button 412, Logout button 414, Help button 416, and a set 417 of controls for navigation among pages of the affiliation management site.

Functions performed on activation of a button are defined in the page as prepared by create presentation process 212 and as interpreted by browser 156. Generally, activation of a button initiates a chain of events ending with making a request and/or submitting a form. Making a request may include transmitting a message so as to indicate that a link is to be followed. Submitting a form may include transmitting merely the entries made in a presented form. Transmitting is from client 104 to server 102. The processes performed as activation of a button may be passed to client 104 as script to be interpreted (e.g., Java script).

A submitted form may serve as one or more requests. For example, submission may impliedly request that the submitted information be added to or replace values and records of database 206. In alternative or in addition, the implication may be that on completion of processing of the submitted information, a particular presentation be returned in response. The "next" presentation may be indicated on the legend of the button being activated or implied by the context from which the submission occurred. For example, a Calendar presentation lists a title of an appointment. Following a link on a note entry button beside the appointment may produce a note entry/edit presentation. After creating text for a new note, various buttons may be available for submission: attach to this appointment (ItemDate) and return to calendar presentation; attach to the associated Item to be available from every occurrence (ItemDates) and return to calendar presentation; or attach to attendee and continue to contacts presentation for creating notes to be attached to other Persons.

By activating Today button 410, a request is made for a presentation of a calendar and/or task list describing Items related to today's date. Information for a Today presentation may be restricted, for example, by the currently effective Affiliation 418 and Aggregation 467.

By activating Chat button 412, a request is made for joining an existing or new chat session. An initial presentation for a chat session may describe the affiliates now on line and available for joining a chat session with the requesting affiliate, a list of currently operating chat sessions open to the requesting affiliate, and/or a list of topics for intermittent chat similar to a conventional bulletin board service. According to various aspects of the present invention, the affiliates displayed as currently available in an existing chat session and/or for inviting to a new chat session may be restricted, for example, by the currently effective Affiliation 418 and Aggregation 467.

By activating Logout button 414, the user's session is terminated normally.

By activating Help button 416, a request is made for an initial page of a conventional help service to be presented. A help service provides information about how to use the affiliation manager generally or in particular concerning the current presentation or a feature of the current presentation. Information presented by the help service, according to various aspects of the present invention may be restricted, for example, by the currently effective Affiliation 418 and Aggregation 467.

In one embodiment, the site pages are organized in named functional groups that can be adapted to a context of an Affiliation and an Aggregation. An affiliation in this context includes a description of the persons, information, things, and their interrelationships that model an organization. As an initial condition of affiliation management, each user has a so-called personal Affiliation. In addition, a particular user may define and use several affiliations including the Affiliations defined by affiliates.

Set 417 includes text-menu box 418 for a user to specify an affiliation, text-menu box 420 for the user to specify a service to be used in presenting information or for forming a request with respect to the specified Affiliation 418, and Go button 422. By activating Go button 422 the user indicates that the user's specification of an affiliation 418 and a service 420 are complete and a suitable request is consequently made for an initial page of the service 420 of the Affiliation 418.

Services may include: add/edit Items (e.g., tasks or appointments), add/edit ItemDates (e.g., recurring tasks or appointments), add/edit persons (e.g., contact lists), add/edit a Project, add/edit fees and expenses, present a day view calendar/task list, present a week view calendar/task list, present a month view calendar/task list, present a DateRange view calendar/task list, add/edit categories of Items, add/edit recurring expenses, add/edit fee/expense accounts, add/edit aggregations, down load a subset of collected time charges and expense charges, add/edit groups of persons, add/edit locations, add/edit resources, obtain or control a critical path analysis of a project, and add/edit preferences for operation of affiliation manager 136 by this affiliate (e.g., default views, default "next" presentations, default field values added automatically from particular contexts, and default relationships added automatically from particular contexts).

Region 404 includes a presentation of time capture status and a set of controls for controlling capturing and collecting time. In display area 430, time capturing is reported as "stopped" (as shown) or "running"; and, accumulated captured time is reported (shown as 1 hour and 42 minutes). By activating ClockIn button 432, a request is made for time capturing to begin or to resume. By activating ClockOut button 434, a request is made for time capturing to be stopped. By typing time (e.g., "0:20" for twenty minutes, or "1.2 hours") in text box 436, a request is made for posting the specified amount of time that was not captured via buttons 432 and 434. Captured time is associated with the name of the affiliate who was identified to the time or expense (e.g., the user of the current session) and an ItemDate (e.g., specified in region 406).

In a preferred implementation, captured time and expenses (herein called charges) are collected until extracted, then archived indefinitely. An affiliate with suitable usage rights may specify criteria for selecting some or all collected charges, request that the selected charges be identified as a subset, and request a down load of the subset to any particular network destination (e.g., the affiliate's terminal or personal computer).

Region 405 includes a group of buttons for selecting alternate presentations for region 406, a group of buttons for beginning data entry, and a control for selecting which aggregation of items will be presented in region 406. By activating Calendar button 440, a request is made for a combination calendar and task list presentation of Items and related information (as shown) in region 406. By activating Tasks button 442, a request is made for a larger and more detailed task list presentation of Items and related information in region 406. By activating Contacts button 444, a request is made for a presentation of Persons and related information in region 406. Each alternate presentation includes forms for data entry and controls for requesting other pages of the site. Buttons in region 405 may be omitted from alternate presentations for region 406. For example, a Contacts presentation omits buttons 450-456.

Alternate implementations may include additional buttons (not shown). For example, a folders button may provide a list of folders and contents (e.g., files also herein called documents, and email). An emails button may provide a list of messages (e.g., an in box, out box, or folder containing messages). And, a search button may provide a form for the user to specify parametric values for any conventional search of records of database 206.

By activating each of Day button 450, Week button 452, Month button 454, and DateRange text-menu box 456, a request is made for Items associated with a different span of time. For example, on calendar 462 the week's worth of appointment Items 460 and task Items 470 (as shown) is responsive to a prior activation of Week button 452. A DateRange is a prior user-defined arbitrary span of time (e.g., 2 weeks or 90 days).

By activating Appt button 446, a request is made for a form for user input of a new or revised appointment Item. By activating Task button 448, a request is made for a form for user input of a new or revised task Item. By activating Contact button 458, a request is made for user input of a new or revised description of a Person. By activating Project button 459, a request is made for user input of a new or revised Project (e.g., a group of task Items for collaboration, conventional critical path analysis, or for a Gantt chart presentation with interrelated time bars).

The forms requested by buttons 446, 448, 458, and 459 may include regions similar to region 402 and buttons for requesting forms for user input of new or revised data for any other object or relationship of database 206.

Text-menu box 467 presents alternative Aggregations for user selection. In the example Calendar presentation, on activating an Aggregation different from the current Aggregation, a request is made for appointment Items, task Items and related information for presentation in region 406 provided that these data are part of the specified Aggregation. If text is entered in box 467, a request is made for defining a new Aggregation.

Region 406 includes a calendar 460, a task list 470, and a Show Contacts button 490. Calendar 460 includes a grid 461 or list of appointment descriptions (e.g., 462, 463) in calendar date order. Task list 470 includes a column of task descriptions (e.g., 472) presented in a default order or an order specified by the user in any conventional manner (e.g., sorted by due date, sorted by task status).

Aggregations may be created automatically and/or by user specification; and, are generally made part of the current affiliation. Built in aggregations include an aggregation that includes only those items that have not been read yet by the user in this or any prior session. The aggregation may be called "unread" or "new or updated". For each user, database 206 may track with a suitable binary flag whether or not an appointment, task, project, contact, note, document, message, or email has been presented to this user in full for review. On review, the respective flag is not asserted. On revision, by any user, of content or of relationship referring to the thing being tracked, the flag is again asserted. Another built in aggregation may use the same flags but presents a list of items (e.g., appointments, tasks, contacts, projects) to which the unread content or relationship pertains (e.g., change of attendees to an appointment, change of a document attached to a task).

A new aggregation may be automatically defined and added for each new affiliate (registered user or member), each new contact (unregistered user), and each new project of the affiliation.

A user defined aggregation may specify a criteria comprising a value (e.g., absolute, relative, or wild card) for any one or more database fields, for example, a particular category and a particular resource; or a particular location and a particular date range.

After an aggregation is specified and asserted in the current session, as discussed above, all subsequent affiliation management functions will then be restricted to records related to the specified criteria (e.g., lists of notes, tasks, appointments, and further queries).

Automatically defined aggregations and built in aggregations simplify access by the user who can then pick a suitable aggregation from a drop down list 467 as opposed to diverting attention to specifying a new aggregation when needed.

Calendar grid 461 may appear as a grid or column depending on the span of time to be presented. As shown, presentation 461 includes a column of rows, each row having indicia of a calendar date. The calendar date may act as a button that, when activated, requests a form for user entry of a new or revised appointment Item automatically configured for the date activated. Each row may further include one or more descriptions of appointment Items, and several buttons for each description. For example, row 462 includes a title 464 of an appointment Item that includes a hypertext link, a list of persons 465 identified to the appointment that includes a hypertext link for each person, a T button 466, an E button 467, and an N button 468. By following title link 464, a request is made for a form for revising or learning more about the appointment Item. By following a person link 465, a request is made for a form for revising or learning more about the person (e.g., a phone number). By activating T button 466, a request is made to begin capturing time for this user against the FeeAccount related to the appointment Item. By activating E button 467, a request is made to capture an expense for this user against the ExpenseAccount related to this appointment Item. To capture an expense, a form is typically provided for user entry of the description of the expense and specification of related information. By activating N button 468, a request is made for a form for user input of a Note to be related to this appointment Item.

Task list 470 includes a column of rows, each row describing a task Item. For example, row 472 includes a title 484 of a task Item that includes a hypertext link, a list 486 of names of persons associated with the task Item, each name including a hypertext link, a T button 474, an E button 476, an N button 482, a text-menu box 478, and a due date 480. By following title link 484, a request is made for a form for revising or learning more about the task Item. By activating T button 474, a request is made to begin capturing time for this user against the FeeAccount related to the task. By activating E button 476, a request is made to capture an expense for this user against the ExpenseAccount related to this task Item. To capture an expense, a form is typically provided for user entry of the description of the expense and specification of related information. By activating N button 482, a request is made for a form for user input of a Note to be related to this task Item. By following a person link 486, a request is made for a form for revising or learning more about the person (e.g., phone number). Drop down menu items of box 478 specify the task completion status as, for example, "to do", "doing", and "done". Alternatively a percent complete (e.g., 55%) may be entered in text box 578.

Other presentations may have regions and elements as discussed above. In addition, the legends for the buttons may be replaced for use of affiliation manager 136 by users familiar with another language. Further, the legends may be replaced with graphic symbols such as a clock face for the "T" of a T button, a currency symbol for the "E" of an E button, and an icon of a note tablet page or an icon of a pencil for the "N" of an N button.

When a form is requested by activating a button that is in proximity to other indicia or is located in a spatial context with other indicia of a presentation, suitable limitations for existing entities and relationships for any new entities may be automatically specified, saving confusion and tedious user entry for the revised or new entity. For example, Show Contacts button 490 differs from Contacts button 444, though activating either button requests a list of existing contacts and a form for user entry of a new contact, that is, data describing a person (e.g., not necessarily an affiliate). The list provided by button 444 includes persons who are part of Affiliation 418. The form provided by button 444 presumes each new contact is to be part of Affiliation 418 and a suitable relationship is automatically created when the form is submitted. The list provided by button 490 includes persons who are part of the current aggregation 467. The form provided by button 490 presumes each new contact is part of the asserted aggregation 467 and numerous suitable relationships are automatically created when the form is submitted.

Database 206 of store 126 may be implemented with an entity-relationship structure 500 of FIGS. 5-11. An entity is an object in the sense of a conventional object oriented database. An object includes attributes and may further include methods (e.g., Java scripts). An object may be represented by a database table having rows and columns (e.g., Person 506 of FIG. 5). Each row of a database table corresponds to one record. Each column of a database table corresponds to a field of the record; each field expressing a value for an attribute of an instance of the entity. Each line between entities represents a relationship between the entities. For clarity of presentation, all relationships are presented as many-to-many relationships. For example, to represent that a person may "have" more than one phone number, line 608 (FIG. 6) connects Person table 506 to Phone table 602. The records being associated (one person record and several phone records) are listed in a Person-Phone table 608 that describes the relationship. Each record of Person-Phone table 608 may have attributes describing a particular relationship. In this example, the phone number associated with a person may be described as a "work" phone or a "home" phone. The database tables facilitate describing many-to-many relationships, such as when a home owner's home phone number is also his or her housekeeper's work phone number.

The relationships expressed in entity relationship structure 500 are presented as "associations" as opposed to "constituents". Consequently, when a phone number relationship is deleted from Person-Phone table 608 and from Phone table 602 for one person, the formerly associated record(s) of Person table 506 are not consequently deleted. However, if no record of Person table 506 and no record of Location table 512 refers to a particular record of Phone table 602, the "orphaned" phone record may be discovered and deleted by the database manager.

An entity may consist merely of a key value without attributes. Further information concerning the entity may be represented as relationships. For example, Charge table 902 of FIG. 9 consists merely of ChargeId so as to express the idea that an Extract (528) has (904) many Charges (902); and each charge is either a fee (906) or an expense (908). As is well known in database design technologies, an implementation of structure 500 may omit entities consisting merely of one key field. For example, Charge table 902 and relationship table 904 may be omitted and instead, ChargeId values may be fields of other tables as needed (e.g., 528, 906 and 908). Alternate implementations of structure 500 include non-normalized forms of database 206 for reasons of security or speed of access.

Some relationships involve more than two entities. For example, to represent that a particular person's time is to be charged for a particular occurrence of an ItemDate, as discussed above, Charge-ItemDate-Person table 814 relates Charge entity 802, Person entity 506, and ItemDate entity 702.

Each entity includes one key field used to access the entity records according to an index of key field values. Each relationship may include a two or more key field values of particular entity records being associated (e.g., 2 keys for each record of 812 and three keys for each record of 814). For clarity of presentation, all key values of structure 500 are identified by fields named with the suffix "Id" being an abbreviation for a unique "identification" value assigned by database manager 133 when a row of an entity table is created. Many entities have a field for Name. The Name field value typically is text used in presentations as a hypertext link to view more detail and/or edit the instance of the named entity (e.g., 464, 465, 484, 486). For some entities, a Description field value supplements the Name field value for explaining to users of various presentations what the entity is about.

Three mechanisms facilitate data entry by a user. First, a data entry form may have drop down menus listing known and/or suggested values so that data entry requires picking a menu item as opposed to typing the text of a desired value. For example, when defining the responsible person for a Task, a drop down menu may provide a "contact list" relative to a suitable Group, or relative to a suitable Affiliation.

Figure 7:
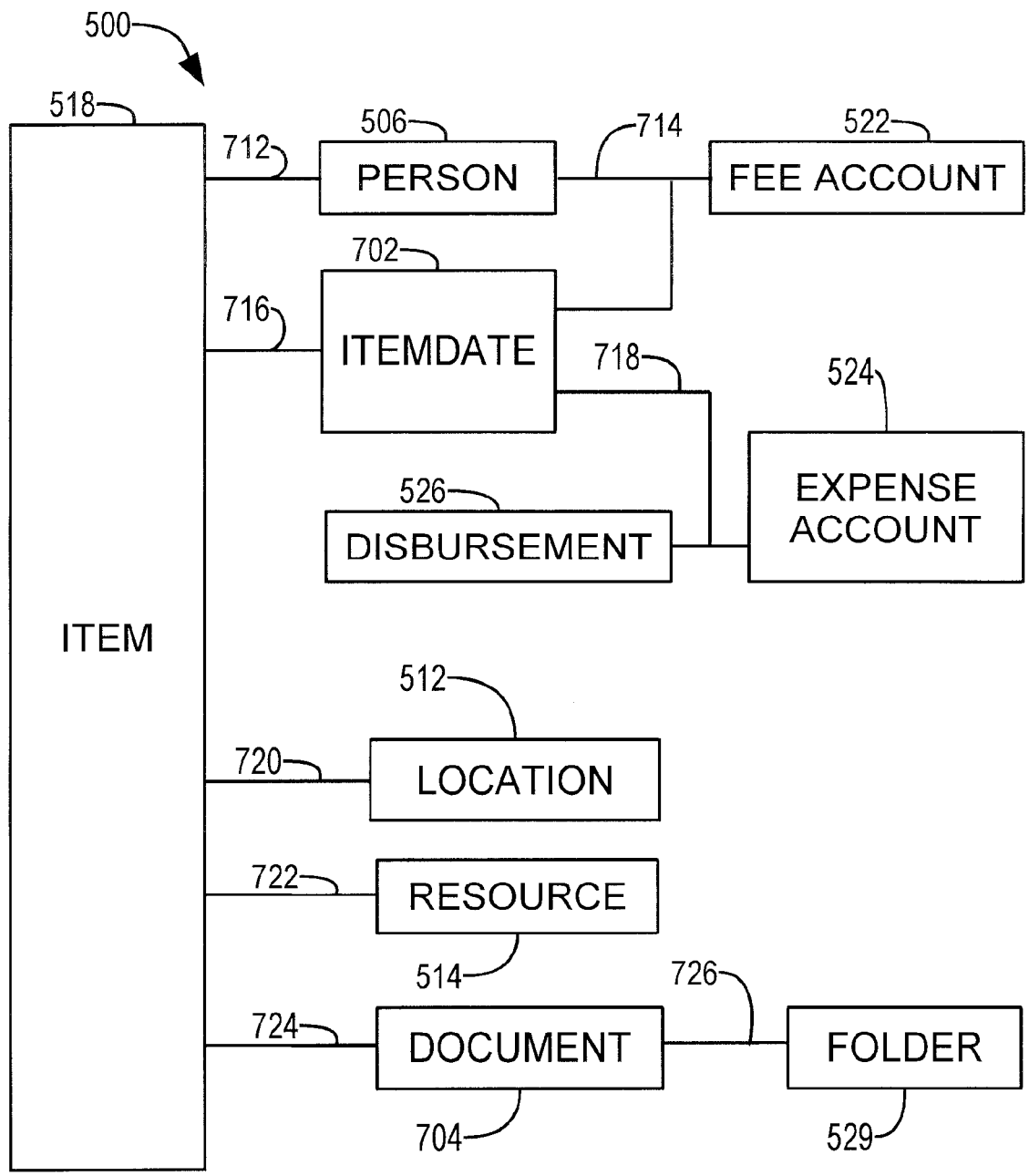
Figure 8:
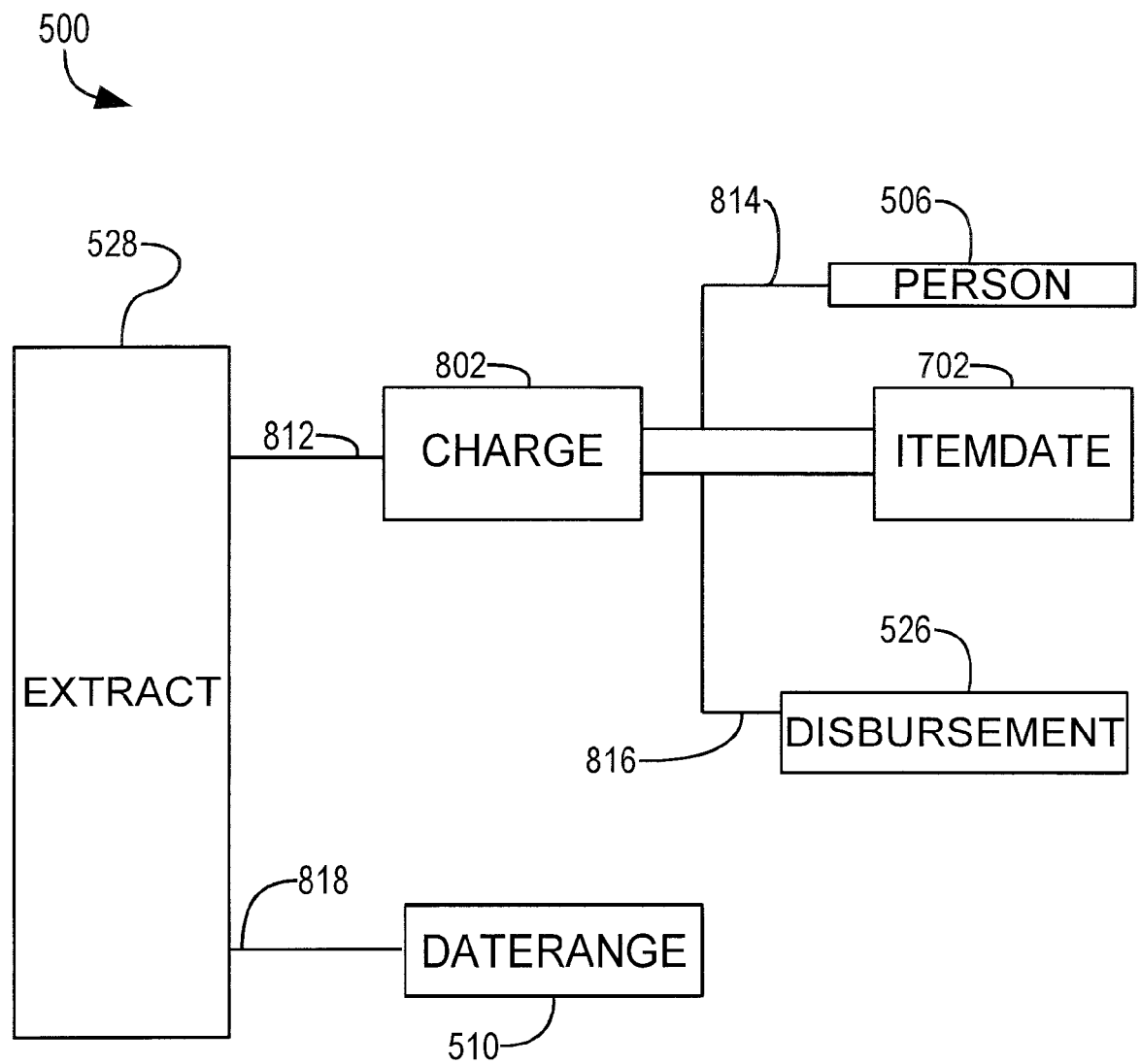
Figure 9:
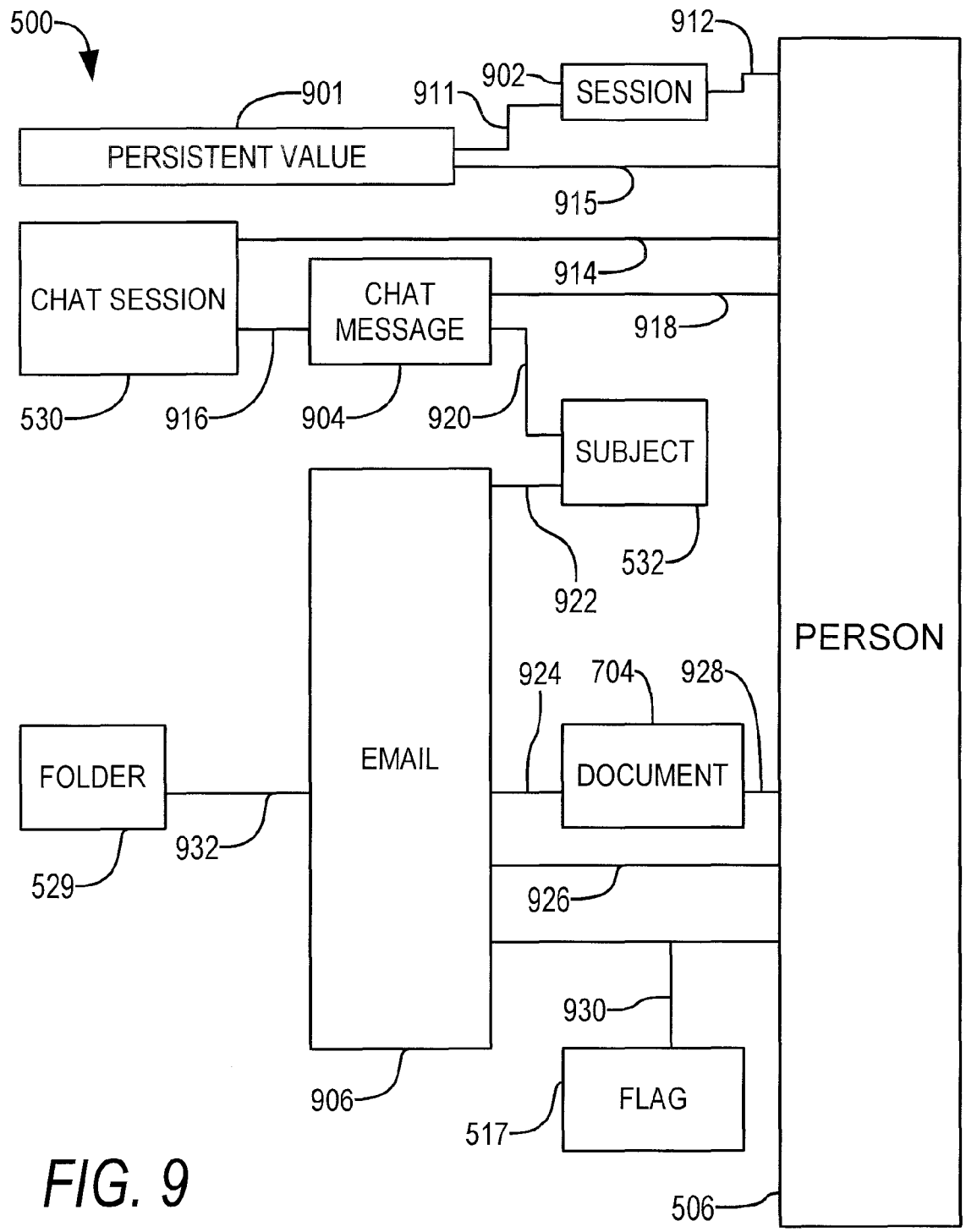
Figure 10:
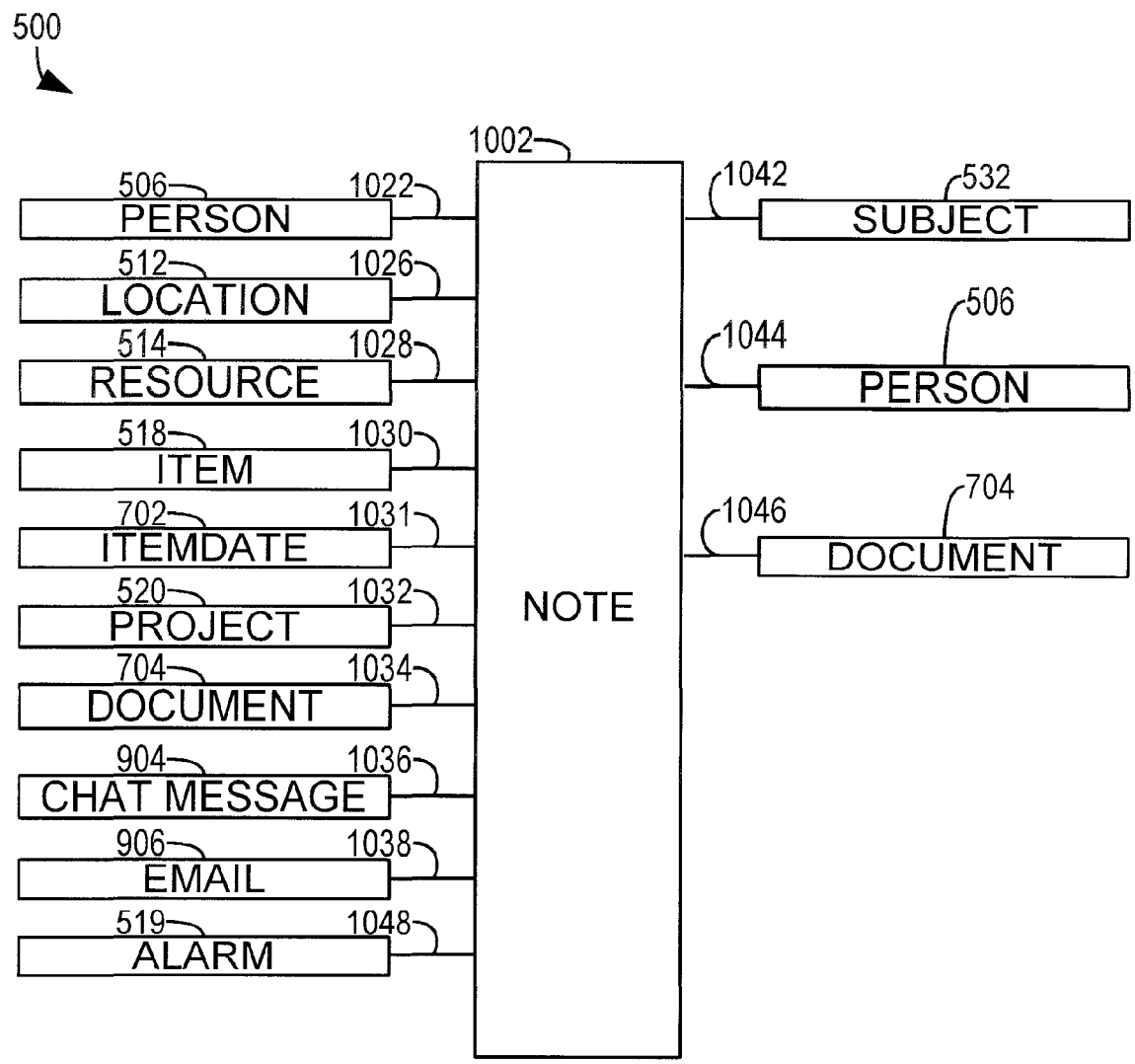
Figure 11:
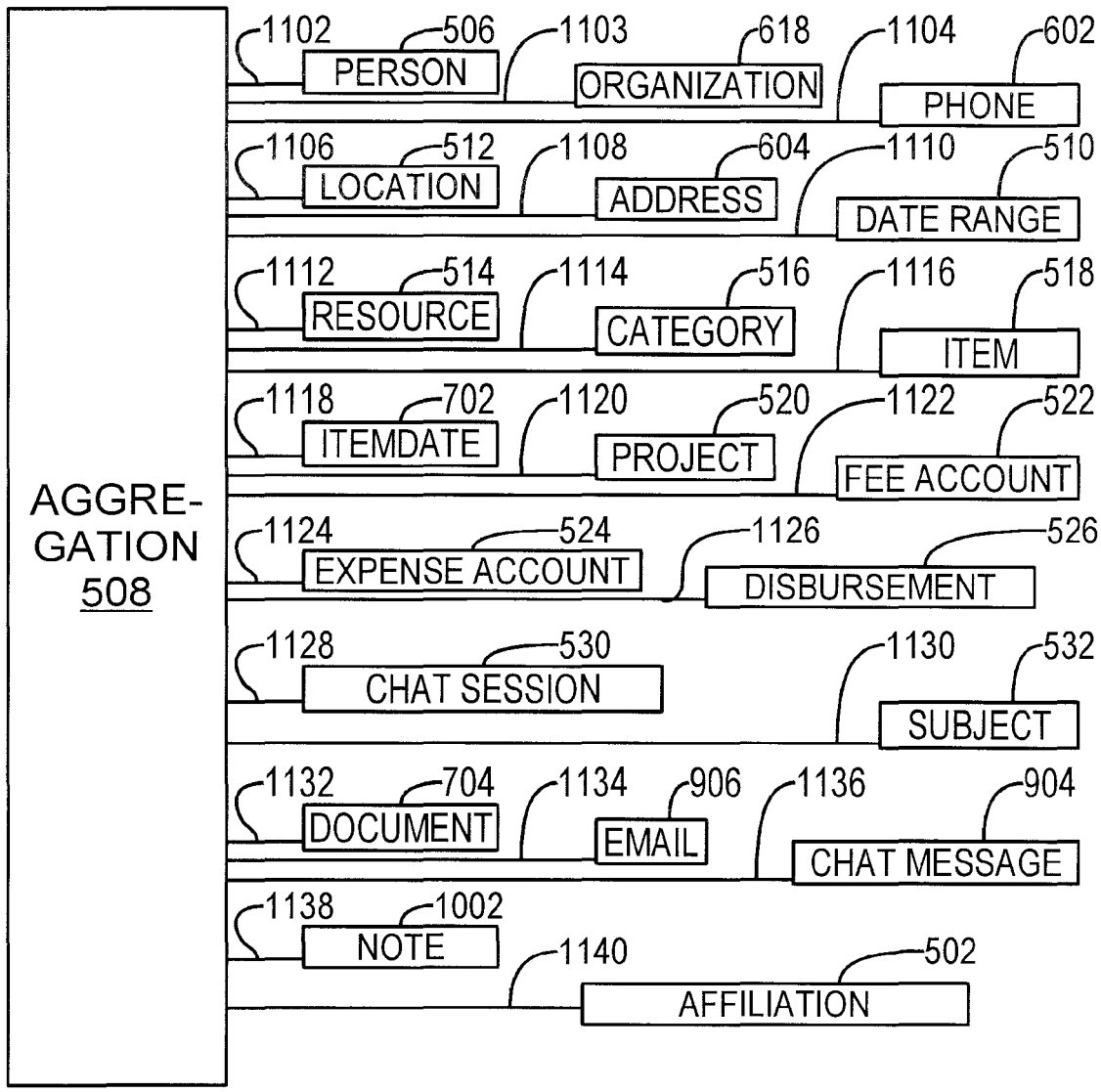
Figure 12:
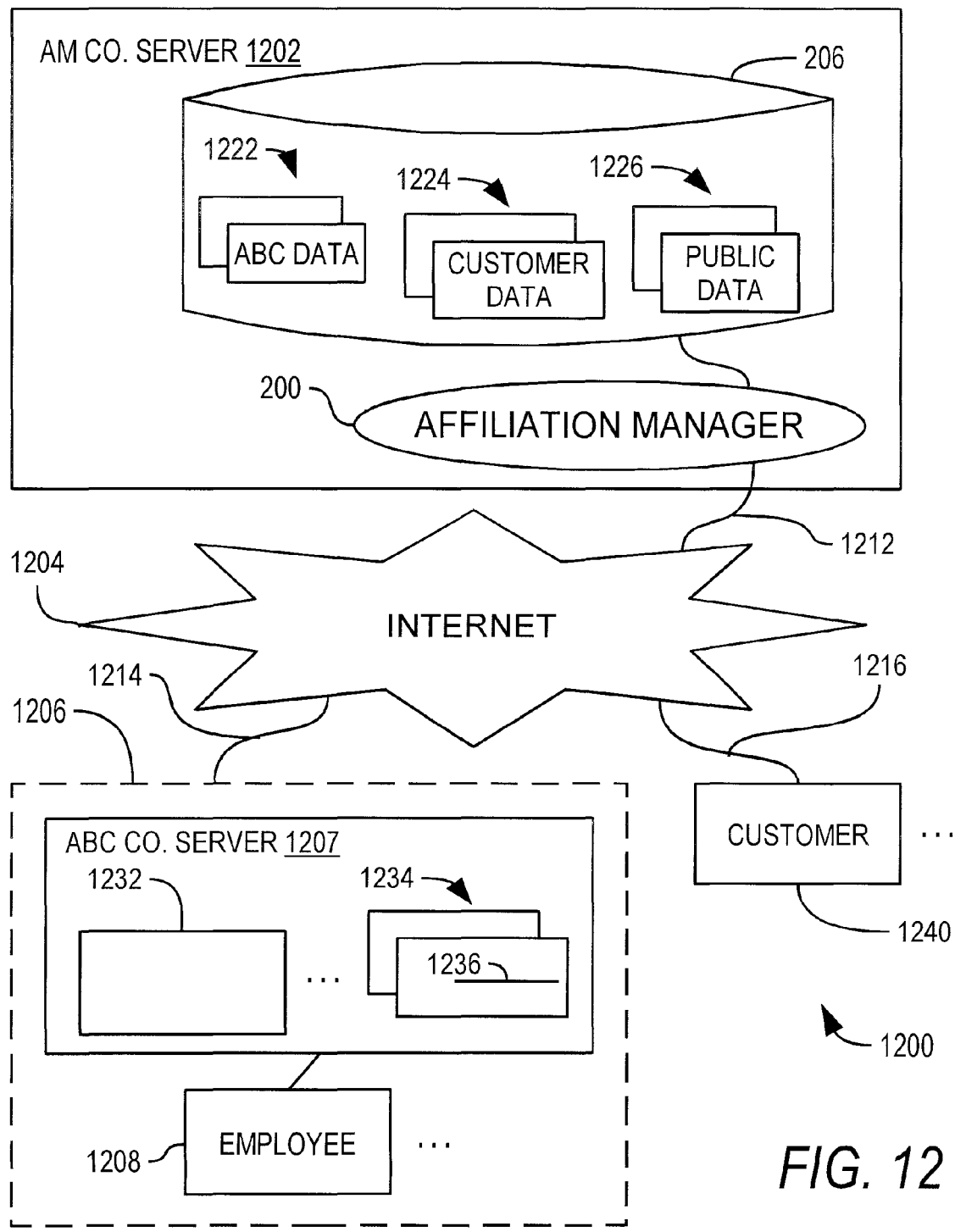
FIG. 12 is a functional block diagram of a system according to various aspects of the present invention.

Second, a data entry form is provided in a manner customized to the context in which the data entry form was requested. For example, an entity definition entry/edit form (e.g., for a new Aggregation 508, not shown) has drop down menus for specifying numerous entities and relationships (e.g., as shown in FIG. 7). However, the entities (e.g., Person) and/or entity instances (e.g., particular Persons) listed on the drop down menus of a customized data entry form are limited to those that are part of, inter alia, the Affiliation, Aggregations, Group, and Category that are currently in force. An access Aggregation 550 and a subject matter Aggregation 467 may both be in force.

Third, data entry may be facilitated by limiting the scope of access to various entities and entity instances. For example, Groups, Persons, Organizations, Aggregations, DateRanges, Locations, Resources, Categories, Items, Projects, FeeAccounts, ExpenseAccounts, Disbursements, Extracts, ChatSessions, Folders, Flags, Alarms, and PersistentValues related to a first Affiliation (and generally referred to as data) do not conflict with same-named Groups, Persons, Organizations, Aggregations, DateRanges, Locations, Resources, Categories, Items, Projects, FeeAccounts, ExpenseAccounts, Disbursements, Extracts, ChatSessions, Folders, Flags, Alarms, and PersistentValues of a second Affiliation. In other words, a user has the freedom to create a new entity (or data) using the same name another user assigned to a different entity and affiliation manager 136 maintains the two same-named entities without commingling the parts of each in presentations to each user.

Table 1 presents the record structures of all entity tables and all relationship tables of structure 500 (FIGS. 5-11).

TABLE 1

| Ref. | Database Table Name | # | Field Name | Comment |
|---|---|---|---|---|
| 502 | Affiliation | 1 | AffiliationId | A registered Person 506 has one or more Affiliations 502 (548). An affiliation is a collection of information that the Person will see and edit in a Session 902. For convenience of affiliation management, any parts of one Affiliation may be parts of any number of other Affiliations. In this way several whole Affiliations (possibly administered by others) may be a convenient part of one of several Affiliations used by a Person in a Session. |
| 502 | Affiliation | 2 | Name | |
| 504 | Group | 1 | GroupId | A Group typically has many Persons 506 (546). A Group may be a member 544 of another Group. For example, a work group may have designers, assemblers, and managers. |
| 504 | Group | 2 | Name | |
| 506 | Person | 1 | PersonId | |
| 506 | Person | 2 | Name | First name, middle name(s), last name (s), titles, salutations, and suffixes may be implemented in separate fields. |
| 506 | Person | 3 | PersonType | For example: Minor/Adult, or Male/Female. |
| 506 | Person | 4 | Username | Used to begin a Session 902. |
| 506 | Person | 5 | Password | Used to begin a Session 902. |
| 506 | Person | 6 | EmailAddress | |
| 506 | Person | 7 | BillingRate | The default rate to charge for this Person's time, for example, in dollars per hour. |
| 506 | Person | 8 | AffiliationId | Identifies the Affiliation to be used for an initial context 418 for a Session 902 started by this Person. |
| 506 | Person | 9 | AggregationId | Identifies an initial Aggregation 467 to be used for a Session 902 started by this Person. |
| 508 | Aggregation | 1 | AggregationId | An Aggregation provides a configuration for conveniently using a selected subset (552) of an affiliation 502. The configuration may define the scope of presentations (e.g., how many day rows 462 in a "week view" 452). An Aggregation may implement usage rights and restrictions. |
| 508 | Aggregation | 2 | Name | |
| 510 | DateRange | 1 | DateRangeId | A DateRange provides a named span of time, which may be absolute (e.g., Mardi Gras 1995) or relative (e.g., a 9 month gestation period) |

TABLE 1-continued

| Ref. | Database Table Name | # | Field Name | Comment |
|---|---|---|---|---|
| 510 | DateRange | 2 | Name | |
| 510 | DateRange | 3 | FromDateTime | |
| 510 | DateRange | 4 | ToDateTime | |
| 510 | DateRange | 5 | Duration | For example, 3 days and 12 hours. |
| 512 | Location | 1 | LocationId | A Location describes a physical place such as the place for an appointment, or the site of a building construction task. |
| 512 | Location | 2 | Name | |
| 514 | Resource | 1 | ResourceId | A Resource may describe a physical object related to an Item, for example, a portable piece of equipment, or a delivery of materials. A Resource may alternatively describe a capability for performing a process, for example, video conference management needed for a virtual meeting Item. |
| 514 | Resource | 5 | Name | |
| 514 | Resource | 6 | Description | |
| 516 | Category | 1 | CategoryId | A Category typically has many Items 518 (568). Category is somewhat analogous to Group 504, except that a hierarchical group of Items is called a Project 520. |
| 516 | Category | 2 | Name | |
| 517 | Flag | 1 | FlagId | |
| 517 | Flag | 2 | Unread | Asserted on creation or modification of the flagged data. |
| 517 | Flag | 3 | RSVP | Not required, pending, accepted, denied. |
| 517 | Flag | 4 | Priority | High, medium, low. |
| 517 | Flag | 5 | Highlight | The highlight value may correspond to any one of a set of flag symbols that a user may use in any manner, for example, to make items stand out in a list. |
| 517 | Flag | 6 | Selected | User designated as asserted or not asserted for convenient en masse operations such as move 1375, copy 1376, or delete (not shown) all of the so flagged items. |
| 517 | Flag | 7 | Recurring | Designates the flagged appointment or task as an instance of a set of appointments or tasks, for example, a periodically recurring board meeting. |
| 518 | Item | 1 | ItemId | An Item is the fundamental object being managed by affiliation manager 136. Each Item may model an act of collaboration of an affiliation (e.g., an appointment or a task). |
| 518 | Item | 2 | Name | |
| 518 | Item | 3 | ItemType | For example: appointment or task. |
| 518 | Item | 4 | Description | |
| 518 | Item | 5 | ItemStatus | For example: To do, Doing, On hold, Cancelled, or Done. |
| 518 | Item | 6 | ItemDueDateTime | A target for the completion of all subordinate ItemDates (if any) that are part of this Item. |
| 518 | Item | 7 | ItemCompletion | A stated percent complete entered by an authorized user. |
| 519 | Alarm | 1 | AlarmId | |
| 519 | Alarm | 2 | ItemId | An ItemId or any analogous Id of data associated with the alarm (e.g., a LocationId, ResourceId, ProjectId, FeeAccountId, ExpenseAccountId, DisbursementId, FolderId, DocumnetId, NoteId, OrganizationId, PersonId, AffiliationId, AggregationId, or EmailId). |
| 519 | Alarm | 3 | PersonId | The person being notified by the alarm. |
| 519 | Alarm | 4 | DateTime | |
| 519 | Alarm | 5 | DateTimeType | Absolute, relative to task start, relative to task due, relative to appointment start. |
| 519 | Alarm | 6 | Status | Dormant, active, acknowledged. |
| 519 | Alarm | 7 | SessionId | The alarm may spawn a new session so that the user has complete control of context in which to dispose of the alarm, terminate the new session, and return to the previously existing session. |
| 519 | Alarm | 8 | Description | A comment that may be written by the user or the system when the alarm is |

TABLE 1-continued

| Ref. | Database Table Name | # | Field Name | Comment |
|---|---|---|---|---|
| | | | | defined; and then presented to the user when the alarm becomes active to explain the purpose of this type of alarm (e.g., generic description) or the purpose of this particular instance of the alarm (e.g., customized description). |
| 520 | Project | 1 | ProjectId | A Project typically has many Items. The Items may be expressed with dependency (570) on other Items. |
| 520 | Project | 2 | Name | |
| 520 | Project | 3 | Description | |
| 522 | FeeAccount | 1 | FeeAccountId | A FeeAccount collects time logged (714) by a Person when participating in or performing an Item. |
| 522 | FeeAccount | 2 | Name | |
| 524 | ExpenseAccount | 1 | ExpenseAccountId | An ExpenseAccount collects Disbursements logged (718) by a Person when participating in or performing an Item. |
| 524 | ExpenseAccount | 3 | Name | |
| 526 | Disbursement | 1 | DisbursementId | A Disbursement describes is a recurring cost or a cost that has a unit value. For example, received FAX documents may be billed at a cost per page received. The cost per page is an attribute of a Disbursement; and, the total number of pages for a particular FAXed document is captured (718) with an ItemDate. |
| 526 | Disbursement | 2 | Name | |
| 526 | Disbursement | 3 | UnitCost | |
| 528 | Extract | 1 | ExtractId | An Extract typically has many Charges (802). |
| 528 | Extract | 2 | DateTime | Date and time that this Extract was created. Typically all information of an Extract is reported by download from affiliation manager 136 to accounting system 157. |
| 529 | Folder | 1 | FolderId | Folders may be automatically defined by system 100 or user defined. System 100 may define folders to coordinate, for example, document transfer (e.g., email, items, and other data) among multiple servers 102 on network 106. |
| 529 | Folder | 2 | Name | |
| 530 | ChatSession | 1 | ChatSessionId | A ChatSession enables two or more Persons in currently active Sessions to exchange extemporaneous messages in a dialog. |
| 530 | ChatSession | 2 | Name | |
| 530 | ChatSession | 3 | StartDateTime | A chat session is active when the start date is in the past and the end date is null or in the future. |
| 530 | ChatSession | 4 | EndDateTime | |
| 532 | Subject | 1 | SubjectId | Used to link any Email, ChatMessage, or Note to a Person, Location, Resource, Item, Project, Document, other ChatMessage, or other Email. |
| 532 | Subject | 2 | Name | |
| 532 | Subject | 3 | Description | Suitably includes words and phrases to assure correlation between email text and a proper SubjectId. |
| 532 | Subject | 4 | SubjectStatus | For example: Open or Closed. By closing a subject, associating to that subject subsequently received email and chat messages may be precluded. |
| 542 | Affiliation-Group | 1 | AffiliationId | |
| 542 | Affiliation-Group | 2 | GroupId | A user may create any number of Groups in any of several Affiliations, limited by access privileges (550) and Aggregations currently in force. |
| 542 | Affiliation-Group | 3 | WgRelationship | Nexus: a social organization identified in field 2 may correspond to the nexus of this Affiliation (e.g., a company, a team, a church, a club). Part: a Group may be a part of the Affiliation without being its nexus. |

TABLE 1-continued

| Ref. | Database Table Name | # | Field Name | Comment |
|---|---|---|---|---|
| 544 | Group-Group | 1 | GroupId | Ordinate. |
| 544 | Group-Group | 2 | GroupId | Subordinate. The subordinate Group is an affiliate of the ordinate Group. |
| 546 | Group-Person | 1 | GroupId | |
| 546 | Group-Person | 2 | PersonId | Used as a "contact list" for this Group. |
| 548 | Affiliation-Person | 1 | AffiliationId | |
| 548 | Affiliation-Person | 2 | PersonId | |
| 548 | Affiliation-Person | 3 | WpRelationship | Administrator: the Person in field 2 generally has access to edit/add/delete all records of the Affiliation. A Person who created or edited the Affiliation and a system administrator may each be defined as Administrator for an affiliation. Contact: used as a "contact list" for this Affiliation. |
| 550 | Affiliation-Person-Aggregation | 1 | AffiliationId | |
| 550 | Affiliation-Person-Aggregation | 2 | PersonId | |
| 550 | Affiliation-Person-Aggregation | 3 | AggregationId | Identifies the AccessAggregation. The Person of field 2 has access only to those records that are included in this Aggregation. |
| 550 | Affiliation-Person-Aggregation | 4 | UsageRight | For example: permission to Create various kinds of objects (Affiliations, Persons, etc.), permission to Delete various kinds of objects and relationships, Edit, Link to, or View. |
| 552 | Affiliation-Aggregation | 1 | AffiliationId | |
| 552 | Affiliation-Aggregation | 2 | AggregationId | Identifies a SubjectAggregation. |
| 554 | Affiliation-DateRange | 1 | AffiliationId | |
| 554 | Affiliation-DateRange | 2 | DateRangeId | |
| 556 | Affiliation-Location | 1 | AffiliationId | |
| 556 | Affiliation-Location | 2 | LocationId | |
| 558 | Location-Person | 1 | LocationId | |
| 558 | Location-Person | 4 | PersonId | Identifies a Person serving as a contact at this location (e.g., receptionist, host, switchboard operator, or guard). |
| 560 | Affiliation-Resource | 1 | AffiliationId | |
| 560 | Affiliation-Resource | 2 | ResourceId | |
| 562 | Resource-Location | 1 | ResourceId | |
| 562 | Resource-Location | 2 | LocationId | |
| 564 | Resource-Person | 1 | ResourceId | |
| 564 | Resource-Person | 2 | PersonId | Identifies a Person serving as a contact for this Resource (e.g., usage coordinator, repairman). |
| 566 | Affiliation-Category | 1 | AffiliationId | |
| 566 | Affiliation-Category | 2 | CategoryId | |
| 567 | Flag-Item-Person | 1 | FlagId | |
| 567 | Flag-Item-Person | 2 | ItemId | |
| 567 | Flag-Item-Person | 3 | PersonId | |
| 567 | Flag-Item-Person | 4 | Comment | May be displayed when a pointing device cursor is located over an icon of the particular flag to explain or suggest usage of the flag. |
| 568 | Category-Item | 1 | CategoryId | |
| 568 | Category-Item | 2 | ItemId | |
| 569 | Affiliation-Item | 1 | AffiliationId | |
| 569 | Affiliation-Item | 2 | ItemId | |
| 570 | Item-Item | 1 | ItemId | Ordinate. |
| 570 | Item-Item | 2 | ItemId | Subordinate. |
| 570 | Item-Item | 3 | ItemRelationship | For example: Starts after (AND), Starts after (OR), or Ends with. |
| 571 | Alarm-Item-Person | 1 | AlarmId | |
| 571 | Alarm-Item-Person | 2 | ItemId | |
| 571 | Alarm-Item-Person | 3 | PersonId | |

TABLE 1-continued

| Ref. | Database Table Name | # | Field Name | Comment |
|---|---|---|---|---|
| 572 | Affiliation-Project | 1 | AffiliationId | |
| 572 | Affiliation-Project | 2 | ProjectId | |
| 574 | Project-Item | 1 | ProjectId | |
| 574 | Project-Item | 2 | ItemId | |
| 576 | Project-Person | 1 | ProjectId | |
| 576 | Project-Person | 2 | PersonId | Identifies a Person serving as a contact for this Project (e.g., a cost, logistics, and schedule coordinator). Other Persons performing tasks of a Project are related (712) to Items. |
| 578 | Affiliation-FeeAccount | 1 | AffiliationId | |
| 578 | Affiliation-FeeAccount | 2 | FeeAccountId | |
| 580 | FeeAccount-Person | 1 | FeeAccuntId | |
| 580 | FeeAccount-Person | 2 | PersonId | Identifies a Person serving as a contact for this FeeAccount (e.g., to whom to send a bill). |
| 582 | Affiliation-ExpenseAccount | 1 | AffiliationId | |
| 582 | Affiliation-ExpenseAccount | 2 | ExpenseAccountId | |
| 584 | ExpenseAccount-Person | 1 | ExpenseAccountId | |
| 584 | ExpenseAccount-Person | 2 | PersonId | Identifies a Person serving as a contact for this FeeAccount (e.g., to whom to send a bill). |
| 586 | Affiliation-Disbursement | 1 | AffiliationId | |
| 586 | Affiliation-Disbursement | 2 | DisbursementId | |
| 588 | Affiliation-Extract | 1 | AffiliationId | |
| 588 | Affiliation-Extract | 2 | ExtractId | |
| 590 | Extract-Person | 1 | ExtractId | |
| 590 | Extract-Person | 3 | PersonId | Identifies a Person serving as a contact for this Extract (e.g., who ordered the Extract). |
| 591 | Affiliation-Folder | 1 | AffiliationId | |
| 591 | Affiliation-Folder | 2 | FolderId | |
| 592 | Affiliation-ChatSession | 1 | AffiliationId | |
| 592 | Affiliation-ChatSession | 2 | ChatSessionId | |
| 593 | Person-Folder | 1 | PersonId | |
| 593 | Person-Folder | 2 | FolderId | |
| 594 | Affiliation-Subject | 1 | AffiliationId | |
| 594 | Affiliation-Subject | 2 | SubjectId | |
| 595 | Folder-Folder | 1 | FolderId | Ordinate. |
| 595 | Folder-Folder | 2 | FolderId | Subordinate. |
| 596 | Person-Person | 1 | PersonId | Ordinate. |
| 596 | Person-Person | 2 | PersonId | Subordinate. |
| 596 | Person-Person | 3 | PpRelationship | For example: supervisor of ordinate, secretary of ordinate, job share partner, spouse of ordinate, child of ordinate, client of ordinate, vendor of ordinate, prospect of ordinate, or other. |
| 602 | Phone | 1 | PhoneId | |
| 602 | Phone | 2 | PhoneNumber | |
| 604 | Address | 1 | AddressId | |
| 604 | Address | 2 | Name | For example, the name of a campus, an estate, an office park, or a building. |
| 604 | Address | 3 | Room | |
| 604 | Address | 4 | Floor | |
| 604 | Address | 5 | StreetAddress | |
| 604 | Address | 6 | City | |
| 604 | Address | 7 | State | |
| 604 | Address | 8 | ZipCode | |
| 604 | Address | 9 | Country | |
| 606 | TimeZone | 1 | TimeZoneId | |
| 606 | TimeZone | 2 | Name | |
| 606 | TimeZone | 3 | ZuluOffset | |
| 606 | TimeZone | 4 | SummerOffset | |
| 608 | Person-Phone | 1 | PersonId | |
| 608 | Person-Phone | 2 | PhoneId | |
| 608 | Phone | 3 | Description | For example: Work, Home, Mobile. |

TABLE 1-continued

| Ref. | Database Table Name | # | Field Name | Comment |
|---|---|---|---|---|
| 610 | Person-Location | 1 | PersonId | |
| 610 | Person-Location | 2 | LocationId | |
| 610 | Person-Location | 3 | Description | For example: Residence, School, or Day Job. |
| 612 | Location-Phone | 1 | LocationId | |
| 612 | Location-Phone | 2 | PhoneId | |
| 614 | Location-Address | 1 | LocationId | |
| 614 | Location-Address | 2 | AddressId | |
| 616 | Location-TimeZone | 1 | LocationId | |
| 616 | Location-TimeZone | 2 | TimeZoneId | |
| 618 | Organization | 1 | OrganizationId | |
| 618 | Organization | 2 | Name | A company name. |
| 620 | Person-Organization | 1 | PersonId | |
| 620 | Person-Organization | 2 | OrganizationId | |
| 620 | Person-Organization | 3 | Title | Person's official title in the organization (e.g., President). |
| 622 | Organization-Organization | 1 | OrganizationId | Ordinate. |
| 622 | Organization-Organization | 2 | OrganizationId | Subordinate. |
| 702 | ItemDate | 1 | ItemDateId | An ItemDate models an act of collaboration by one or more affiliates during one uninterrupted period of time. An Item 304 may have (716) several ItemDates (342, 344, 346). |
| 702 | ItemDate | 2 | StartDateTime | |
| 702 | ItemDate | 3 | EndDateTime | |
| 702 | ItemDate | 4 | Repetitions | Identifies the position of this ItemDate in a series of occurrences, for example, 2nd (344) of a total of 3 (304). |
| 702 | ItemDate | 5 | RepeatInterval | For example, the number of days (7) from ItemDate 342 start (the 7th) to ItemDate 344 start (the 14th). |
| 702 | ItemDate | 6 | RepeatStartDate | For example, period 306 start (the 4th). |
| 702 | ItemDate | 7 | RepeatEndDate | For example, period 306 end (the 30th) |
| 702 | ItemDate | 8 | Duration | A relative duration for completing the ItemDate. Facilitates scheduling Project Items in cascade. |
| 704 | Document | 1 | DocumentId | |
| 704 | Document | 2 | DocumentPath | The document itself may be any type of data in any storage format. For example, text, graphics, spreadsheet, database, audio, video, streaming audio/video, program, object, script, module, library; or a structure (e.g., hypertext, XML) comprising any of the above (e.g., for use as a web page, applet, or email). |
| 712 | Item-Person | 1 | ItemId | |
| 712 | Item-Person | 2 | PersonId | |
| 712 | Item-Person | 3 | IpRelationship | For example: Controller (a Person responsible for the cost, logistics, or schedule of the item); Actor (a Person solely or jointly responsible for performing or participating in an Item; or Invitee (a GroupId for those permitted to edit the Item, e.g., to join themselves to the Item. All Actors may also be Controllers to facilitate editing the Item. |
| 714 | ItemDate-Person-FeeAccount | 1 | ItemDateId | |
| 714 | ItemDate-Person-FeeAccount | 2 | PersonId | |
| 714 | ItemDate-Person-FeeAccount | 3 | FeeAccountId | Account for billing hourly fees for this Person and ItemDate. |
| 714 | ItemDate-Person-FeeAccount | 3 | IpfStatus | For example: Pending, Approved, Invoiced, or Posted |
| 714 | ItemDate-Person-FeeAccount | 4 | BillableTime | For example, a total number of tenth hours cumulated between user activations of time collection functions (buttons 466, 474, 432, 434; and box 436). |

TABLE 1-continued

| Ref. | Database Table Name | # | Field Name | Comment |
|---|---|---|---|---|
| 714 | ItemDate-Disbursement-ExpenseAccount | 4 | IdeStatus | For example: Pending, Approved, Invoiced, or Posted |
| 714 | ItemDate-Person-FeeAccount | 5 | BillingrateOverride | A rate to charge that is used in place of the BillingRate (506) of this Person |
| 716 | Item-ItemDate | 1 | ItemId | |
| 716 | Item-ItemDate | 2 | ItemDateId | |
| 718 | ItemDate-Disbursement-ExpenseAccount | 1 | ItemDateId | |
| 718 | ItemDate-Disbursement-ExpenseAccount | 2 | DisbursementId | |
| 718 | ItemDate-Disbursement-ExpenseAccount | 3 | ExpenseAccountId | Account for billing expenses, for example, a credit card number. |
| 718 | ItemDate-Disbursement-ExpenseAccount | 4 | DisbursementQty | For example, the number of pages of a received FAX as discussed above. |
| 718 | ItemDate-Disbursement-ExpenseAccount | 5 | DisburseDiscount | |
| 720 | Item-Location | 1 | ItemId | |
| 720 | Item-Location | 2 | LocationId | |
| 722 | Item-Resource | 1 | ItemId | |
| 722 | Item-Resource | 2 | ResourceId | |
| 724 | Item-Document | 1 | ItemId | |
| 724 | Item-Document | 2 | DocumentId | |
| 726 | Folder-Document | 1 | FolderId | |
| 726 | Folder-Document | 2 | DocumentId | |
| 802 | Charge | 1 | ChargeId | A Charge corresponds to a record selected from either ItemDate-Person-FeeAccount 714 or ItemDate-Disbursement-ExpenseAccount 718. |
| 812 | Extract-Charge | 1 | ExtractId | |
| 812 | Extract-Charge | 2 | ChargeId | |
| 814 | Charge-ItemDate-Person | 1 | ChargeId | |
| 814 | Charge-ItemDate-Person | 2 | ItemDateId | |
| 814 | Charge-ItemDate-Person | 3 | PersonId | Identifies who's chargeable time is associated to this ItemDate. |
| 816 | Charge-ItemDate-Disbursement | 1 | ChargeId | |
| 816 | Charge-ItemDate-Disbursement | 2 | ItemDateId | |
| 816 | Charge-ItemDate-Disbursement | 3 | DisbursementId | Identifies the recurrent disbursement for this ItemDate. |
| 818 | Extract-DateRange | 1 | ExtractId | |
| 818 | Extract-DateRange | 2 | DateRangeId | A period of time during which Charges are to be included in this Extract. |
| 901 | PersistentValue | 1 | PersistentValueId | |
| 901 | PersistentValue | 2 | ParameterName | Parameter names may be any field name or additional names. System defined parameters may be used to maintain context as a user proceeds on a thread (e.g., a drill down) successively applying query criteria by asserting aggregations and/or by activating icons or links that have implied criteria associated by spatial relations or other context of the icon. System 100 may use persistent values to log for each type of thing, the existence of at least one unread or unacknowledged thing and the absence of all unread things (e.g., tasks, appointments, contacts, folders, emails, notes attached to tasks, notes attached to appointments, notes attached to contacts, and RSVPs). |
| 901 | PersistentValue | 3 | ParameterValue | |
| 902 | Session | 1 | SessionId | For a client-server session begun by a user who may or may not yet be a Person. |
| 902 | Session | 2 | StartDateTime | A session is Active if the StartDateTime is in the past and the EndDateTime is null or in the future. |

TABLE 1-continued

| Ref. | Database Table Name | # | Field Name | Comment |
|---|---|---|---|---|
| 902 | Session | 3 | EndDateTime | |
| 902 | Session | 4 | Machine | Platform information for platform-dependent communication 134 or platform-dependent presentation 212. |
| 904 | ChatMessage | 1 | ChatMessageId | |
| 904 | ChatMessage | 2 | CSentDateTime | |
| 904 | ChatMessage | 3 | CRcvdDateTime | |
| 904 | ChatMessage | 4 | Title | |
| 904 | ChatMessage | 5 | ChatMessageText | |
| 906 | Email | 1 | EmailId | |
| 906 | Email | 2 | ESentDateTime | |
| 906 | Email | 3 | ERcvdDateTime | |
| 906 | Email | 4 | Title | |
| 906 | Email | 5 | EmailText | |
| 911 | Session-Value | 1 | SessionId | |
| 911 | Session-Value | 2 | PersistentValueId | May be used for context and state that applies until the session is terminated normally. |
| 912 | Session-Person | 1 | SessionId | |
| 912 | Session-Person | 2 | PersonId | |
| 914 | ChatSession-Person | 1 | ChatSessionId | |
| 914 | ChatSession-Person | 2 | PersonId | |
| 914 | ChatSession-Person | 3 | CpRelationship | For example: Initiator, Participant, Mediator |
| 915 | PersistentValue-Person | 1 | PersistentValueId | |
| 915 | PersistentValue-Person | 2 | PersonId | Personal preferences and configuration settings. |
| 916 | ChatSession-ChatMessage | 1 | ChatSessionId | |
| 916 | ChatSession-ChatMessage | 2 | ChatMessageId | |
| 918 | ChatMessage-Person | 1 | ChatMessageId | |
| 918 | ChatMessage-Person | 2 | PersonId | Sender |
| 920 | ChatMessage-Subject | 1 | ChatMessageId | |
| 920 | ChatMessage-Subject | 2 | SubjectId | |
| 920 | ChatMessage-Subject | 3 | Link | PersonId, LocationId, ResourceId, ItemId, ProjectId, DocumentId, ChatMessageId, or EmailId |
| 922 | Email-Subject | 1 | EmailId | |
| 922 | Email-Subject | 2 | SubjectId | |
| 922 | Email-Subject | 3 | Link | PersonId, LocationId, ResourceId, ItemId, ProjectId, DocumentId, ChatMessageId, or EmailId |
| 924 | Email-Document | 1 | EmailId | |
| 924 | Email-Document | 2 | DocumentId | A Document that is attached to an Email. |
| 926 | Email-Person | 1 | EmailId | |
| 926 | Email-Person | 2 | PersonId | |
| 926 | Email-Person | 3 | EpRelationship | For example: To, From, Cc, Bcc. |
| 926 | Email-Person | 4 | EmailStatus | For example: Unread/Read for whether this person has read this email. AwaitingReply/DisposedOf for whether this person considers that the email should be replied to or has already been suitably disposed of by any means. Alternate implementations further include analogous relationships for tracking whether a Person has read a Document provided to that Person by Note or Email, and whether a Person has read a Note attached to an Item, ItemDate, Location, Resource, Project, or Person record related to that Person. |
| 928 | Document-Person | 1 | DocumentId | |
| 928 | Document-Person | 2 | PersonId | |
| 928 | Document-Person | 3 | DpRelationship | For example: Author, Editor, Translator, Publisher, or Distributor |
| 930 | Flag-Email-Person | 1 | FlagId | |
| 930 | Flag-Email-Person | 2 | EmailId | |
| 930 | Flag-Email-Person | 3 | PersonId | |

TABLE 1-continued

| Ref. | Database Table Name | # | Field Name | Comment |
|---|---|---|---|---|
| 932 | Folder-Email | 1 | FolderId | A folder may serve as an in-box, out-box, or store for buffered or saved email. |
| 932 | Folder-Email | 2 | EmailId | |
| 1002 | Note | 1 | NoteId | |
| 1002 | Note | 2 | NoteCreationDateTime | |
| 1002 | Note | 3 | Title | |
| 1002 | Note | 4 | NoteText | |
| 1022 | Person-Note | 1 | PersonId | |
| 1022 | Person-Note | 2 | NoteId | |
| 1026 | Location-Note | 1 | LocationId | |
| 1026 | Location-Note | 2 | NoteId | |
| 1028 | Resource-Note | 1 | ResourceId | |
| 1028 | Resource-Note | 2 | NoteId | |
| 1030 | Item-Note | 1 | ItemId | |
| 1030 | Item-Note | 2 | NoteId | |
| 1031 | ItemDate-Note | 1 | ItemDateId | |
| 1031 | ItemDate-Note | 2 | NoteId | |
| 1032 | Project-Note | 1 | ProjectId | |
| 1032 | Project-Note | 2 | NoteId | |
| 1034 | Document-Note | 1 | DocumentId | |
| 1034 | Document-Note | 2 | NoteId | |
| 1036 | ChatMessage-Note | 1 | ChatMessageId | |
| 1036 | ChatMessage-Note | 2 | NoteId | |
| 1038 | Email-Note | 1 | EmailId | |
| 1038 | Email-Note | 2 | NoteId | |
| 1042 | Note-Subject | 1 | NoteId | |
| 1042 | Note-Subject | 2 | SubjectId | |
| 1042 | Note-Subject | 3 | Link | PersonId, LocationId, ResourceId, ItemId, ProjectId, DocumentId, ChatMessageId, or EmailId |
| 1044 | Note-Person | 1 | NoteId | |
| 1044 | Note-Person | 2 | PersonId | Author |
| 1046 | Note-Document | 1 | NoteId | |
| 1046 | Note-Document | 2 | DocumentId | A Document that is attached to a Note. |
| 1048 | Alarm-Note | 1 | AlarmId | |
| 1048 | Alarm-Note | 2 | NoteId | Any number of notes may be associated to an alarm to explain reasons for the alarm or required actions to respond to the alarm. Notes may be standard or custom and may be prepared or revised by the system and/or by the user. |
| 1102 | Aggregation-Person | 1 | AggregationId | |
| 1102 | Aggregation-Person | 2 | PersonId | |
| 1103 | Organization-Aggregation | 1 | OrganizationId | |
| 1103 | Organization-Aggregation | 2 | AggregationId | |
| 1104 | Aggregation-Phone | 1 | AggregationId | |
| 1104 | Aggregation-Phone | 2 | PhoneId | |
| 1106 | Aggregation-Location | 1 | AggregationId | |
| 1106 | Aggregation-Location | 2 | LocationId | |
| 1108 | Aggregation-Address | 1 | AggregationId | |
| 1108 | Aggregation-Address | 2 | AddressId | |
| 1110 | Aggregation-DateRange | 1 | AggregationId | |
| 1110 | Aggregation-DateRange | 2 | DateRangeId | |
| 1110 | Aggregation-DateRange | 3 | Purpose | For example, Day view 450, Week view 452, Month view 454, or Year view (not shown). |
| 1112 | Aggregation-Resource | 1 | AggregationId | |
| 1112 | Aggregation-Resource | 2 | ResourceId | |
| 1114 | Aggregation-Category | 1 | AggregationId | |
| 1114 | Aggregation-Category | 2 | CategoryId | |

TABLE 1-continued

| Ref. | Database Table Name | # | Field Name | Comment |
|---|---|---|---|---|
| 1116 | Aggregation-Item | 1 | AggregationId | |
| 1116 | Aggregation-Item | 2 | ItemId | |
| 1118 | Aggregation-ItemDate | 1 | AggregationId | |
| 1118 | Aggregation-ItemDate | 2 | ItemDateId | |
| 1120 | Aggregation-Project | 1 | AggregationId | |
| 1120 | Aggregation-Project | 2 | ProjectId | |
| 1122 | Aggregation-FeeAccount | 1 | AggregationId | |
| 1122 | Aggregation-FeeAccount | 2 | FeeAccountId | |
| 1124 | Aggregation-ExpenseAccount | 1 | AggregationId | |
| 1124 | Aggregation-ExpenseAccount | 2 | ExpenseAccountId | |
| 1126 | Aggregation-Disbursement | 1 | AggregationId | |
| 1126 | Aggregation-Disbursement | 2 | DisbursementId | |
| 1128 | Aggregation-ChatSession | 1 | AggregationId | |
| 1128 | Aggregation-ChatSession | 2 | ChatSessionId | |
| 1130 | Aggregation-Subject | 1 | AggregationId | |
| 1130 | Aggregation-Subject | 2 | SubjectId | |
| 1132 | Aggregation-Document | 1 | AggregationId | |
| 1132 | Aggregation-Document | 2 | DocumentId | |
| 1134 | Aggregation-Email | 1 | AggregationId | |
| 1134 | Aggregation-Email | 2 | Id | |
| 1136 | Aggregation-ChatMessage | 1 | AggregationId | |
| 1136 | Aggregation-ChatMessage | 2 | ChatMessageId | |
| 1138 | Aggregation-Note | 1 | AggregationId | |
| 1138 | Aggregation-Note | 2 | NoteId | |
| 1140 | Aggregation-Affiliation | 1 | AggregationId | |
| 1140 | Aggregation-Affiliation | 2 | AffiliationId | An Aggregation may include one or more Affiliations. |

Browser 156 presents a graphical user interface (GUI) to a user so that the user may easily request a variety of information from affiliation manager 136 and receive presentations that are rich in information and include many controls for further ad hoc action by the user. Generally, the user provides information to affiliation manager 136 by receiving a form that is presented via the GUI. After the user enters information on the form via browser 156, browser 156 submits the form, that is, transmits the entered information to affiliation manager 136. Edit records process 204 posts the received information into database 500 as discussed above. A "next" presentation is identified and/or triggered within affiliation manager 136. Consequently, create presentation process 212 and send process 216 provide another presentation which generally comprises information for the user, controls for requesting particular forms for additional data entry, controls for requesting particular presentations, and one or more forms for additional data entry.

Database manager 133 provides conventional mechanisms for entry of an initial set of records after which affiliation manager 136 can conduct sessions with users. The initial set of records provides a description of at least one user as a system administrator (e.g., records in tables 506, 502, and 548), and an initial aggregation (e.g., records in all tables of FIG. 7) for permitting access by the system administrator to all tables and records of database 206. Later sessions by the system administrator facilitate entry and editing of any records in database 206, including basic information stored in TimeZone table 606, and Document table 804 (e.g., for conventional "help" functionality automatically assisting other users).

After initialization of database 206 as discussed above, a user may use browser 146 to follow a hypertext link or to specify a URL to begin a session with affiliation manager 136. The first form that a user receives from affiliation manager 136 results in creation of a record in Session table 1002. If the user is not already a registered user (e.g., user is unable to provide password from a suitable existing Person record), affiliation manager 136 provides a form for registration. Registration creates records describing the user, inter alia, in Person table 506, Phone table 602, Location table 512, and Address table 604. After successful validation and posting of information in these tables and corresponding relationship tables (e.g., 608, 610, 612, 614, and 616), affiliation manager 136 creates a record in Affiliation table 502 corresponding to a "personal" affiliation for use by the newly registered user.

A user may define any number of Affiliations that remain accessible to this user as creator. A user may change the view of an Affiliation during a Session (e.g., using text-menu box 418). A user may also define an affiliation to have some or all of the entities and relationships of any number of other Affiliations, provided the user has suitable usage rights. In one implementation, a few standard Affiliations are also available to each user: a "personal" affiliation; and an "all" affiliation that is a composite of all affiliations to which the person is affiliated (e.g., listed with usage rights). For example, a user may create an Affiliation to model his affiliation with a bridge club. A user may find that presentations based on the "all" affiliation may become too cluttered. As a compromise, the user may create an affiliation that includes a combination of several simpler affiliations. For example, a user having access to a ping pong and basketball affiliation may create an "all sports" affiliation for a combination of information about amateur ping pong and amateur basketball. The user may find the "all sports" affiliation more useful than the "all" affiliation. Such a combination of affiliations may be a course, curriculum, summary, résumé, sphere, or world. A presentation of a combination of affiliations may be an "all calendar view" or a world view.

The initial session may terminate at any time due to communication failure, lack of response by the user, user activation of a termination control generally provided by affiliation manager 136 on any form, or as a consequence of lack of resources available for affiliation manager 136 to continue the session. In an ad hoc manner in the current or any number of subsequent sessions, the registered user may request and submit forms to define his or her affiliations to be managed. These forms result in creation in any sequence of any suitable number of records in Group table 502, Aggregation table 508, DateRange table 510, Location table 512, Resource table 514, Category table 516, Item table 518, Project table 520, FeeAccount table 522, ExpenseAccount table 524, and Disbursement table 526.

Associations among records of these tables may be defined automatically by affiliation manager 136 (e.g., by process 218 discussed above) and/or by user entry of information on suitable forms and in suitable presentations contexts provided by affiliation manager 136. Information about these associations is stored by affiliation manager 136 in fields and records of all suitable relationship tables (e.g., attribute values).

A person having no specified username and/or password may be referred to in any suitable manner during operation of system 100. For example, such a person may be a contact, an assignee to a task, and/or a listed author of a document. However, such a person does not have a personal affiliation and cannot login to use system 100.

By defining a personal affiliation, one or more suitable aggregations, associating each aggregation to the person, and specifying a username and password for the person, a user corresponding to the person (i.e., an affiliate) may be granted carefully defined access to a limited portion of database 206. Access may appear to the user as an affiliation management system (*full or limited) as discussed herein, a file server, an email account, or a web site.

Limited access to affiliation management may be implemented, for example, by specifying a suitable access aggregation, as discussed above, associated with an existing affiliation. Consequently, an affiliate such as a client, customer, or supplier may perform only those functions permitted by usage rights of the access aggregation (e.g., view only appointments the affiliate is associated with). Generally, his or her personal affiliations may be viewed in concert with the information of any number of such limited access affiliations (e.g., using the "all affiliations" selection 418). An administrator may designate some persons with permission to grant access (e.g., to a customer) on an item by item basis. A suitable revised aggregation is created and maintained automatically to implement item by item access grants.

System 100 may present functions to a user as a file server. For example, a Files as discussed above when asserted presents a request for a presentation of files associated with the affiliation, access aggregation, and subject aggregation of the requesting user and session context. Any conventional presentation may be provided, for example, a hierarchical (tree) presentation of folders and files (as in Microsoft Windows®) may be used. Conventional navigation may be supported for listing the contents of folders and opening of files (e.g., for execution, download, viewing, editing, or performance of audio and/or video content). According to various aspects of the present invention, each listed file (e.g., a row of a list) may include icons and/or links for access to related data (e.g., contacts, notes, documents, authors, appointments, tasks, or projects). Icons or links may be included for capturing time and expenses to be related to the listed file (e.g., billing for review and edit).

System 100 may present functions to a user as an email account. For example, an Emails button as discussed above when asserted presents a request for a presentation of emails associated with the affiliation, access aggregation, and subject aggregation of the requesting user and session context. Any conventional presentation may be provided, for example, a user interface of in and out boxes and folders with compose, reply, and forward function buttons (as in Microsoft Outlook®) may be used. Conventional navigation may be supported for the listing of emails persons, and attachments and the opening of emails, contact descriptions (e.g., person records), and attachments (e.g., links to items, notes, documents, other emails (threads), files, and folders) as discussed above. According to various aspects of the present invention each listed email (e.g., a row of a list) may include icons and/or links for access to related data (e.g., contacts, notes, documents, authors, appointments, tasks, or projects). Icons or links may be included for capturing time and expenses to be related to the listed email (e.g., billing for review and response). Email, as used herein, differs from conventional message services of the type known and used under Lotus Notes® (marketed by Lotus Development and IBM corporations) and SendMail (a UNIX program by Eric Allman). Here, when an item or any other data is created or updated within an Affiliation, all users (and only such users) having access to the Affiliation may access the item or data and may have prompt notice of the item's or data's creation or update. Conventional message services generally include email specific protocols for communication and data storage (e.g., SMTP, name server conventions); these protocols are not necessary and are omitted in preferred implementations of the present invention. If multiple servers 102 are to share information, any multiple server database product having replica synchronization may be used. Clients 104 do not include a custom (or separate) program (e.g., cc: Mail, Eudora, Microsoft Outlook) for writing, reading, or communicating. Communicating as discussed above with reference to Email 906 is functionally analogous to communicating as discussed above with reference to any other item or data (e.g., new and revised Affiliation, Person, Group, Aggregation, DateRange, Location, Resource, Category, Item, Project, FeeAccount, ExpenseAccount, Disbursement, Extract, Folder, ChatSession, Subject, Flag, Alarm, Organization, Phone, Address, TimeZone, ItemDate, Document, Extract, Charge, PersistentValue, Session, ChatMessage, or Note). For example, an alternate implementation includes suitable additional Flags and/or PersistentValues for notice of these items and data when "unread" and presentation icons for "drill down" access as discussed herein. Preferably, database 206 (e.g., per FIGS. 5-11) is implemented with conventional relational database technology for high speed and flexible indexing and access. In addition, views of data read from such a database are presented in pages read by a conventional browser (e.g., any markup language such as HTML, XML).

System 100 may present functions to a user as a web site. For example, an aggregation may be limited to documents (e.g., HTML pages) with hypertext links among these documents. In addition, all or selected ones (or none) of such pages may include icons and/or links for access to related data (e.g., contacts, notes, documents, authors, appointments, tasks, or projects). Icons or links may be included for capturing time and expenses to be related to the listed web site (e.g., billing for research or purchasing on-line).

A user may be admitted to an existing Affiliation (e.g., an affiliation created by another user). Admission of a first user is typically accomplished by a second user that is an administrator of that Affiliation. For example, the first user may request and be supplied by affiliation manager 136 a list of existing Affiliations. The first user may request a message be sent to a suitable second user (e.g., an administrator), for admission to a particular Affiliation. After any suitable communication between the first user and the administrator (e.g., email, a chat session, a phone conversation, or land mail to addresses provided by affiliation manager 136), the administrator may request an admission page having a form. The administrator may edit and submit the form, requesting affiliation manager 136 to create and edit all necessary records and field values accomplishing admission. The form may be customized with the first user's identification, have a drop down menu listing all users with requests for admission not yet disposed of by administrators of this Affiliation, or have a drop down menu listing all users of an affiliation that includes the first user. By entry of the first user's identification on the form for admission and submitting the form, the administrator makes a request to affiliation manager 136 to create and edit all suitable fields and records of entity tables and relationship tables (e.g., attribute values), accomplishing admission of the first user into the desired Affiliation. The AccesAggregation for the first user may be specified on the admission form or may be a default (e.g., minimal access privileges) AccessAggregation. Consequently, the first user's awareness of and use of features of the new Affiliation are controlled by actions of the second user, i.e., an administrator of this Affiliation.

Provided that access privileges for creating Affiliations are suitably assigned, a first user may define himself or herself as administrator of a particular Affiliation he or she has created. With suitable advertising via an affiliation manager and by any conventional method, the first user may receive requests from others for admission to the particular Affiliation.

Explosive growth in the use of affiliation manager 136 may be realized when new users are granted the privilege to create Affiliations and admit members. New members may already have similar privileges or may, by being admitted to a particular Affiliation gain privileges to create additional Affiliations. In an implementation according to structure 500, Affiliations are not hierarchical and each new Affiliation may have more or fewer privileges extended to its members as the Affiliation from which it was created.

A new chat session is initiated, according to various aspects of the present invention, according to the following method. A first user requests a chat session initiation page. The chat session initiation page provides a list of other users (e.g., links to Person records) for which a Session is in progress. The list of other users is limited, as discussed above, by the Affiliation, AccessAggregation, SubjectAggregation, and Group currently in force. The first user then requests a chat session be started with one or more other users selected from the list. Affiliation manager 136 issues a chat invitation to each selected other user. A chat message window is provided after affiliation manager 136 has successfully received an affirmative reply to the chat invitation from at least one selected user. Consequently, a user who is not part of the Affiliation, Aggregations, and Group currently in force at the first user, is not interrupted by a chat invitation; and, the activity of the other user is not made apparent to the first user. During a chat session, a chat message requested, completed, and submitted by any person identified to the chat session is presented to each other person identified to the chat session. A user may terminate his or her participation in a chat session by requesting a termination page from affiliation manager 136.

A chat session in alternate implementations includes data transfer other than text via a text window. For example, a chat session using packetized voice data may use a microphone and speaker for direct audio input/output at each client of the chat session. This implementation resembles conventional telephone service (e.g., voice over internet protocol). Analogously, video data may be exchanged separately or in combination with audio and text. This implementation resembles conventional video conferencing service.

In any of the types of chat sessions discussed above, a recording of the actions by each participant may be made and stored in data structure 500 (e.g., table 904 for chat messages). Controls may be provided in any suitable presentation for starting and stopping the recording and for marking portions of the recording for simpler retrieval (e.g., inserting an audio, video, or data mark).

Email from external sources may be received by communication manager 134 and made available in any conventional manner to affiliation manager 136. Affiliation manager 136 may automatically form relationships between the email (e.g., a record in Email table 906) and other entities. For example, affiliation manager 136 may compare any email address of the email (e.g., from address, to address, cc, bcc) to email addresses in Person table 506; and, consequently form suitable relationships (926). Affiliation manager 136 may compare the text of the subject and/or body of the email to Name and Description field values of Subject table 532; and, consequently form suitable relationships (922) to Open subjects. The email may be associated (also herein called attached) as discussed below to any entity to which a match is found between an email address of a Person associated with the entity and the email address of the email itself. For example, an email may be suitably attached to a Group (504, 546), an Affiliation (502, 548), another Person (502, 596), a Location (512, 558, 610), a Resource (514, 564), a Project (520, 576), a FeeAccount (522, 580), an ExpenseAccount (524, 584), an Extract (528, 590), a Phone (602, 608), an Item (518, 712), a billable time (714), a ChatSession (530, 914), a ChatMessage (904, 918) or a Document (704, 928). Attachment may be conditioned on whether the Person corresponding to the received email (the addressee) has a usage right to update the corresponding relationship.

Presentations of information describing an entity (e.g., an Item, an ItemDate, a Person, a Location, a Resource, a Project, a Document, a ChatMessage, or an Email) may indicate unread attached notes, documents, or email is available to be read. Unread notes, documents, or email may be related to the presented information by having a common subject. A method, performed by affiliation manager 136, for preparing a presentation, according to various aspects of the present invention, may include recalling an entity record (e.g., a Person, Location, Resource, Project, Document, ChatMessage, or Email); determining if a relationship links the entity record to a subject entity; and determining if the subject entity is further linked to an unread entity record (e.g., a Document, Note, Email, or ChatMessage). Affiliation manager 136 forms relationships from a Note, Document, ChatMessage, or Email to a particular subject and maintains relationships from that particular subject to other entities to which unread Documents, Notes, ChatMessages, and Email may be related via the common particular subject.

Affiliation manager 136 may amend email to assure proper relationships to one or more entities or subjects. For example, when a user requests a form from affiliation manager 136 for creating an email, the form may be prepared with a suitable reference or link to the context in which the request was made. Or, when the form is submitted, affiliation manager 136 may prepare the email to include a suitable reference or link. Incoming forwarded email from a sender outside affiliation manager 136 may consequently have a copy of the outgoing message comprising a suitable reference or link. "Outgoing" email to a Person whose incoming email is managed by affiliation manager 136 may be handled in a manner similar to posting a Note.

Affiliation manager 136 may include any conventional mechanism for affiliates to arrange a meeting time to which it is possible for each to attend. For example, entities and relationships may be added to structure 500 for permitting and accumulating votes and RSVP requests and replies for arranging meetings.

A note and another entity may be related by association. The association may have attributes. Such an association implements "attaching a note". For example, a note may be attached to any Person (1022), Location (1026), Resource (1028), Item (1030), ItemDate (1031), Project (1032), Document (1034), ChatMessage (1036), or Email (1038). A method performed by an affiliation manager for attaching a note to an entity may include providing a presentation having a control for requesting preparation of a note. After a user operates a suitable control of that presentation, the affiliation manager receives a first request for a form for entering data for a new note. The first request may include a context derived from the presentation. After the requested form has been delivered to the user and the user has entered the data of the note, the method may include receiving a second request to attach a note to an entity. The second request may be implied by the submission of the contents of the form provided in response to the first request. Indicia of the identity of the entity to which the note is to be attached preferably accompanies the first request or may accompany the second request. When the presentation has various controls each of which intended to request the preparation of a note (e.g., N buttons 468, 482) and the arrangement of indicia of the presentation conveys a context, each button may provide a request that supplies indicia of a different context. For example, activation of N button 468 may result in attachment of a note to the ItemDate described by row 462 (an appointment). Activation of N button 482 may result in attachment of a note to the ItemDate described by row 472 (a task).

Usage rights may be managed by an administrator of each affiliation or by automatic functions of affiliation manager 136. For example, a user (e.g., a vendor) who is an assignee of tasks (e.g., to deliver materials) of a project may be granted usage rights to view tasks he or she is assigned and not have access to other tasks of the project. Further, the user may have equivalent usage rights in all projects (e.g., delivery of similar materials) of several affiliations. Another user who is also an assignee of tasks in the same project, on the other hand, may have usage rights to view, edit, and create, his or her own tasks but not delete tasks. A method for assigning usage rights, according to various aspects of the present invention, includes determining a set of rights, creating an Aggregation defining the scope of entities and relationships to which rights of the set may be applied, and associating the Aggregation to a Person corresponding to the user.

Each user may have several AccessAggregations. In one implementation, a user begins a session with one of several usernames, where each username is associated with a different set of usage rights for various of his or her affiliations (e.g., employee and salesman for a company; and coach of the company tennis team). Any AccessAggregation may be used with one or more Affiliations (522, 1140).

In an alternate implementation, maps of geographic regions are included as an entity and related to other entities including Address. Affiliation manager 136 provides upon suitable request from a user in a session, a presentation comprising a map of a geographic region related to any Location (e.g., of a person, or a resource). In an alternate implementation an Aggregation of Locations (e.g., all persons of a Group or related to a Project) may be presented on the same map. Affiliation manager 136 may request and receive a request for a map wherein the request includes a geographic scope (e.g., 1 mile radius) and indicia of an Aggregation from which Locations may be derived by any database technique (e.g., intersection, nonintersection). Further, a user may provide to affiliation manager 136 indicia of current geographic position (e.g., provided by a global position system receiver of client 104). The geographic scope may be based on such indicia of position.

In alternate implementations flags, folders, and alarms may be associated with any information in database 206, for example, information that is presented row-by-row in a list. As discussed above, this information has been referred to as data which may include an Affiliation, a Group, an Aggregation, a Date range, a Location, a Resource, a Category, an Item, a Project, a Fee account, an Expense account, a Disbursement, an Extract, a Folder, a Chat session, a Subject, a Person, a Phone, an Organization, a Location, an Address, a Time zone, an ItemDate, a Document, a Charge, a Persistent value, a Session, a Chat message, an Email, a Flag, an Alarm, or a Note. To implement such associations, additional cross-references analogous to Folder-Document 726, Flag-Item-Person 567, and Alarm-Item-Person may be added to database 206 with suitable controls being added to the user interface for the user to specify his or her intended associations.

System 100 may present to a customer a web site to a user that extends the existing website of an affiliate (e.g., a company) to include information supplied by other affiliates (employees of the company). In one implementation, an application service provider (ASP) hosts an affiliation manager and database as discussed above; and users of the ASP include employees of the company and the company's customers. For example, system 1200 of FIG. 12 includes Affiliation Manager (AM) Co. server 1202, ABC Co. computer system 1206, and customer computer system 1240, each coupled to the Internet 1204 in any conventional manner, AM Co. server 1202 includes database 206 and affiliation manager process 200 as discussed above. Database 206 includes affiliations 1222 related to ABC Co., affiliations 1224 related to customers 1240, and public data 1226 which may include web sites of other companies and individuals not shown. ABC Co.

computer system 1206 includes ABC Co. server 1207, web site pages 1234, additional file 1232, and employee workstation 1208. Customer computer 1240 and employee workstation 1208 represent any number of user operated clients 104 as discussed above.

In operation, customers 1240 may browse personal affiliations 1224 and other websites 1226 as well as other web sites of Internet 1204 (servers not shown) in any conventional manner. In this example, suppose that web site 1234 is hosted for public access and additional files 1232 are hosted for employee access only. Employees 2108 may browse the company web site 1234, view and edit additional files 1232, and collaborate via communication and information exchange as discussed above as served by AM Co. server 1202. For example, appointments, projects, tasks, notes, and emails of Affiliations 1222 are accessible only to employees 1208 as affiliates of ABC Co. affiliations 1222. As desired, an employee 1208 acting as administrator of ABC affiliations 122 may grant limited access to a "guest account" and/or to specific individuals as discussed above with reference to access aggregations to facilitate collaboration among employees 1208 and customers 1240. In one implementation, a customer 1240 browsing web site 1234 follows link 1236 (or activates a suitable icon 1236). With or without express notice to customer 1240, the link (or icon) may present a login request to affiliation manager 200 for access to an affiliation 1222. The login request may utilize the "guest account". In another implementation, the customer is presented with a login presentation for entry of a suitable username and password. Either ABC Co. (or AM Co. as agent for ABC Co.) may have provided in any conventional manner (e.g., by land mail, voice phone, FAX or email) a username and password for use by customer 1240. After login is accepted by affiliation manager 200, customer 1240 may be presented with file server, web site server, or affiliation manager functions as discussed above. Useful but limited access may be provided by process 200 without item by item grants. For example, if the access aggregation and usage rights are specified to include all data and items existing and to be developed that are associated with a particular customer's name, then as a consequence of associating the particular customer's name to any item or data, the customer will have access to it. For instance, as a consequence of an employee meeting planner who associates the particular customer to an appointment, customer 1240 sees the appointment along with any other personal data 1224 on an integrated "all affiliations" view. As desired, employee 1208 may upload additional files 1232 as public data 1226. On the other hand, employee 1208 may upload the same files 1232 as documents (or notes, folders, or email) of an affiliation 1222 within the access aggregation assigned to customer 1240. Consequently, each document uploaded may be subject to access limitations as discussed above; and further may be automatically identified as "unread" to customer 1240 for his or her immediate attention.

Because the usernames (and email folders as well as all affiliation information) used for communication and collaboration as discussed above are not public information, the risk of unsolicited email and email including unwanted content is reduced as compared to typical internet and intranet email use today.

Figure 13:
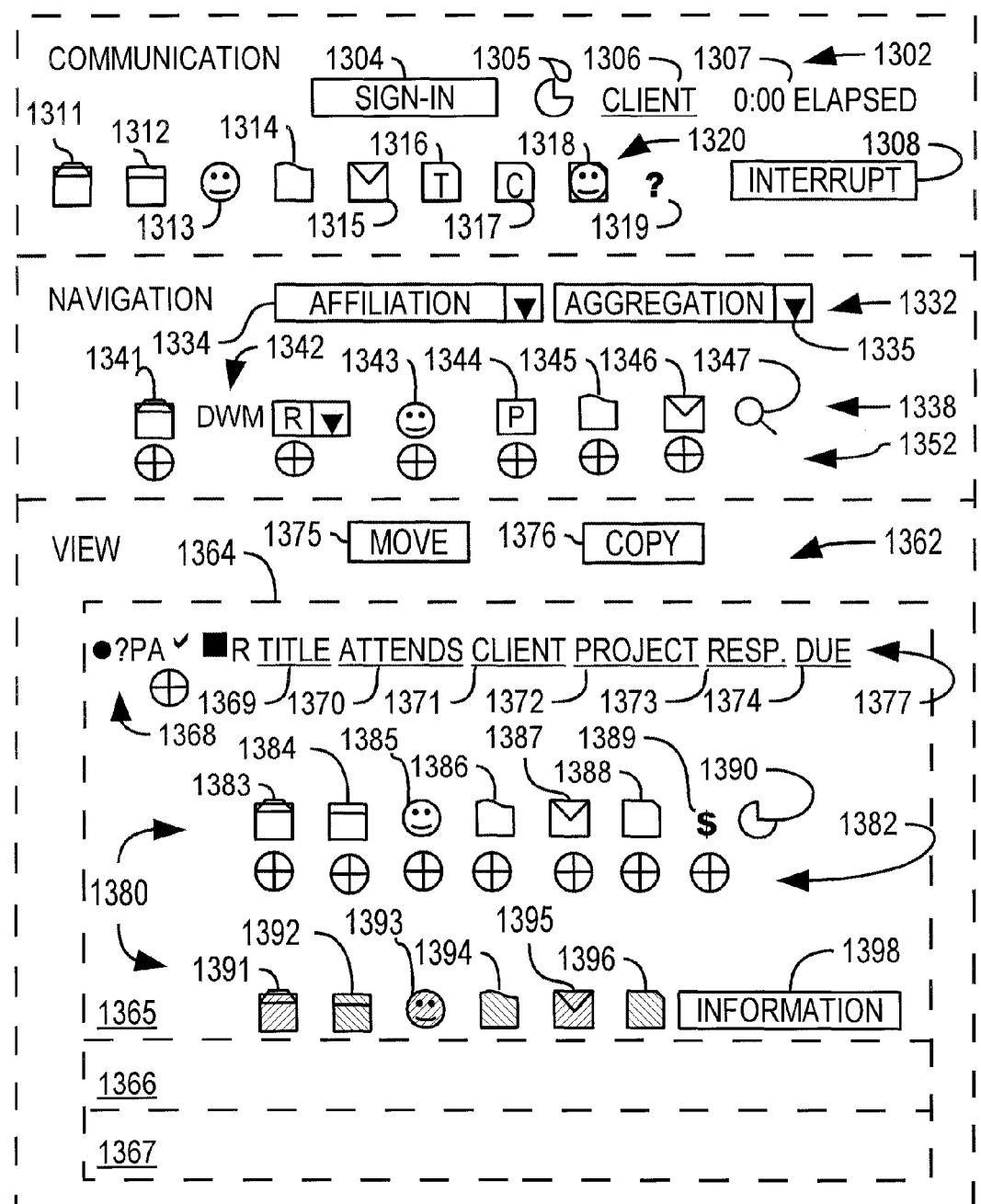
FIG. 13 is a schematic presentation provided by the process of FIG. 2.

Affiliation manager 200 includes aspects according to the present invention that simplify user training and increase user productivity. Training is simplified, inter alia, by using similarly appearing icons in several locations of the presentation for intuitively similar functions; and by using a set of similarly appearing icons (e.g., all members of the set appearing as a note page) for communicating status of referred to information. As an illustration of these principles, consider the schematic presentation 1300, of FIG. 13 provided to a client 104 by a server 102 that hosts process 200 as discussed above. Presentation 1300 includes a communication region 1302, a navigation region 1332, and a view region 1362.

Communication region 1302 includes Sign-in button 1304, timer icon 1305, client name link 1306, elapsed time 1307, Interrupt button 1308, and a set of icons 1320. Sign-in button 1304 when activated posts the time of day to a persistent value as an aid in determining whether all of the user's time on the job has been accounted for by billing activities during the shift. Timer icon 1305 when activated provides a browse function to locate any item or data (e.g., client, task, or appointment) (past, present, or newly defined) to be billed for time. Elapsed time on the currently identified item or data is presented at 1307. On activation of Interrupt button 1308, a new session is begun to allow the user complete flexibility in affiliation management due to an unexpected business opportunity or demand (e.g., an unexpected visitor or telephone call). On completion of the session, billed time resumes in the current session.

Set of icons 1320 illustrates all possible icons. In a typical presentation according to schematic 1300, each icon may appear once, if at all. Set 1302 includes, as shown from left to right, task (clip board) icon 1311, calendar icon 1312, person (face) icon 1313, folder icon 1314, email (envelope) icon 1315, note icons 1316, 1317, and 1318, and RSVP (question mark) icon 1319. Each icon is presented when unread (or unacknowledged) information of the type implied by the icon is present in any affiliation the user has access to. By activating the icon, a request is made to the server to prepare and present a list of the corresponding unread (or unacknowledged) information. According to various aspects of the present invention, such a list includes rows as described below with reference to 1364-1367. Icon 1316 indicates at least one unread note of the type attached to a task. Icon 1317 indicates at least one unread note of the type attached to an appointment (calendar item). Icon 1318 indicates at least one unread note of the type attached to a contact. In a preferred implementation, the color of each icon in set 1320 is uniform (all are green) and matches the color of icons of the set discussed below with reference to 1391-1396. Icons in set 1320 are responsive to posting of new and revised records in database 206 by any user at any time. Consequently, users have prompt notice of information for collaboration.

Navigation region 1332 includes text-menu box 1334 for user specification of an affiliation, text-menu box 1335 for user specification of an aggregation, set of icons 1338 and set of subscript icons 1352. When any icon of set 1338 is activated, a suitable request is sent to the server and the server provides a corresponding presentation. The presentation is limited to the specified affiliation (which may be "all" as discussed above) and aggregation (which may be "none" as discussed above). Icons 1311, 1313, 1314, and 1315 of set 1320 have identical shape and have functions similar to icons 1341, 1343, 1345, and 1346 of set 1338 respectively. In response to activation of any icon of set 1338, a list of the requested information is presented in view region 1362. Generally, a newly requested list replaces a prior list in full. In an alternate implementation, a newly requested list is appended to the bottom of view region 1362 and controls are provided to navigate (scroll backward, jump to item or end) into prior lists and items as desired.

Specifically, the user receives a presentation of all tasks (e.g., a task list) on activation of task icon 1341. A text box (not shown) for reviewing all task notes of the respective task may be included in the description 1364 of each task. The user receives a presentation of all appointments in day (D), week (W), month (M), or date range (R) scope and format (e.g., a calendar column or grid) on activation of one of the calendar icons 1342. The date range (R) may be specified by the user in the text-menu box as shown. The user receives a presentation of all contacts (Persons) on activation of contact icon 1343. The user receives a presentation of all projects on activation of project icon 1344. The user receives a presentation of all folders (and hierarchical contents) on activation of files icon 1345. The user receives a presentation of all emails on activation of emails icon 1346. Finally, the user receives a form for specifying any ad hoc criteria for a search on activation of search icon (magnifying glass) 1347.

Icons may indicate whether any information of the type corresponding to the icon exists. Such indication may be by color of the icon or by shading (e.g., simulated lines of text on clip board or folder icons.

The user may create or add a task, appointment, contact, project, folder, or email by activating the subscript icon (circled plus sign) of set 1352 located close to, adjacent, and below the corresponding icon of set 1338 discussed above. In other words, the user receives a form presented in view area 1362 for data entry that may include preconfigured data corresponding to the context of the request (affiliation 1334 and aggregation 1335). On such a form, text-menu boxes are provided with lists of alternative specifications restricted to the affiliation and aggregation. For example, an email entry form may include a text-menu box (or browse facility as discussed above with reference to 1305) for specifying a particular task or appointment. Specifications appearing on a menu of a text-menu box do not include specifications that are out of the scope of the affiliation 1334 and aggregation 1335. A more complete implied context may be available by operation of similarly appearing icons in set 1382 discussed below. Icons in set 1352 are useful when no suitable context is available in view region 1362.

View region 1362 (when not used for a data entry form as discussed above), includes Move button 1375, Copy button 1376 and list 1364. List 1364 includes any number of rows represented schematically by rows 1365-1367. Generally, rows 1365-1367 have a common format, though several formats are available (e.g., task list, contact list, appointment list, calendar grid, to name a few). Each row corresponds generally to descriptions discussed above (e.g., 462, 463, 472). The functions discussed with reference to presentations 400 and 1300 may be combined in any suitable manner for ease of use by the user. At least one format is available for presenting a plurality of any type of item or data as discussed above, information, links, and icons for one such item or data per row. According to various aspects of the present invention, each row includes a set of icons similar in appearance to icons in other rows of list 1364, similar in appearance to icons of region 1302 and similar in appearance to icons of region 1332.

Row 1365 includes flag icons 1368, links 1377, a set of icons 1380 (1383-1396), a set of subscript icons 1382, and information 1398 describing the item or data of the row (e.g., a task, a contact, an appointment, a folder, a message, or a note).

List 1364 may present information describing a plurality of records of database 206 that satisfy criteria for a query implied by an icon or link activated by the user. Such queries are generally limited by affiliation 1334 and aggregation 1335. The icon or link activated by the user may be any icon of sets 1320, 1338, and 1380 and any link of the set 1377. Query criteria implied by an icon of sets 1368 and 1380 and by a link of set 1377 may suitably include any one or more values from the row in which the activated icon or link exists (e.g., values for fields presented by flags 1368 or links 1377). As a consequence of activating such an icon or link, those values that were used for query criteria are stored (e.g., as records of PersistentValue 901) to further define (and qualify) the context for all subsequent activations of icons in resulting presentations (i.e., each query result being a list having a row comprising icons and links of the type described herein with reference to sets 1368, 1377, and 1380).

Flag icons 1368, if present, include, from left to right, "unread" indicator (e.g., a ball of the color of icons 1320), RSVP pending indicator (question mark), priority indicator (e.g., high (H), medium (M), or low (L)), alarm indicator ("A" in green if alarm is dormant and otherwise black), user highlight (e.g., a check mark), a user selection indicator (e.g., a checkable box) for indicating which rows are to participate in a group function such as move 1375 or copy 1376), and an indicator of whether the appointment or task is an instance of a recurring (R) appointment or task.

Links 1377 are suitable to the type of item or data being presented in the row (e.g., location is relevant to a resource or person but may not be relevant to a task). Particular links do not appear if no field value of the type called for is currently associated to the information of the row. As illustrated for an appointment, links 1377 describe and provide criteria for suitable subsequent queries. Links 1377 include the title 1369 of the appointment (as a link to edit all particulars of the appointment), the names 1370 of attendees (with a query to provide same in contact list format), the name 1371 of the client (typically the organization name with a query to provide particulars of the organization), the name 1372 of the project this appointment relates to (if any) (with a query for all appointments related to the specified project), the name of a person 1373 responsible for the appointment, and the due date 1374 (start date and time of the appointment) (with a link to edit all particulars of the appointment).

Icons 1380 include from left to right task icon 1383 (with a query for all tasks related to the appointment of this row), calendar icon 1384 (generally omitted from a list of appointments but would appear on a task list with a query for all appointments related to the task of this row), person (face) icon 1385 (with a query for all persons related to the appointment of this row), folder icon 1386 (with a query for all folders attached to the appointment of this row), emails icon (envelope) 1387 (with a query for all emails attached to the appointment of this row), and notes icon (a page) 1388 (with a query for all notes attached to the appointment of this row).

Icons for time and expense posting include expense icon (dollar sign) 1389 (with a query for all expenses charged to the appointment of this row), and timer (clock) icon 1390 activation of which starts and stops billing to the appointment of this row. Queries of icons 1383-1389 provide quick access to all information related to the appointment of this row and provide a stepwise drill down for further related information (increasingly qualified) as each icon of a similar set of icons in a row of a subsequently presented list is activated.

Icons 1391 through 1396 may serve as flags to identify which item or items of the list are unread (or unacknowledged). The criteria for whether these icons appear or are omitted is the same criteria behind icons of set 1320. Because a row generally describes only one of the types: task, appointment, contact, folder, email, and note; only one (if any) of the icons of set 1391-1396 appears if that row includes information that is unread (or unacknowledged). For example, the note icon 1396 may appear when a new or updated note has been attached to the appointment and the user has not yet opened that note. In addition, in response to user activation of an icon 1391-1396, the user is presented with a list of the unread (or unacknowledged) information. Opening of each such unread item resets a suitable flag (e.g., Flag 517, 567). Queries of icons 1391-1396 provide quick access to unread information related to the appointment of this row.

Though a common row format is generally used for all rows of a list 1364, different lists may use different formats. Each row format may omit one or more icons of sets 1368, 1377, and 1380. An appointment row format may omit icons 1384 and 1392. In other cases, the corresponding icon is not omitted due to the inclusion in database 206 of a relationship between same type items. For example, a task list row format may retain icons 1383 and 1391 to permit drill down on tasks dependent on the completion of other tasks. As another example, a contact list row format may retain icons 1385 and 1393 to permit drill down in a hierarchical set of relationships between persons (e.g., Person-Person 596 records). In one implementation, icons are provided when hierarchical relations exist and are omitted where they are currently absent from database 206 for the affiliation, aggregation, and context of the row.

Subscript icons 1382 provide functionality for adding data (e.g., tasks, appointments, contacts) related to the information of the row as discussed analogously for icons of set 1352.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A computer readable medium having computer readable instructions recorded therein for being performed by a server and for providing a client browser with information regarding a plurality of affiliations, the browser operated by a user for accurately collecting time billable to an affiliation of the plurality of affiliations, the medium comprising:
    a. instructions for presenting to the user via the browser a first text box, a first icon, and a view region;
    b. instructions for receiving from the user via the browser an operation of the text box that specifies a name of the affiliation;
    c. instructions for obtaining first results of a first query of a database in response to receiving from the user via the browser an operation of the first icon, a first limit of the first query being in accordance with the name of the affiliation;
    d. instructions for presenting to the user via the browser in the view region a first plurality of rows in accordance with the first results, each row presenting a respective portion of the first results and presenting a respective second icon having functionality in accordance with the respective portion of the first results;
    e. instructions for obtaining second results of a second query of the database in response to receiving from the user via the browser an operation of the respective second icon of a first row of the first plurality of rows, a plurality of limits of the second query being in accordance with the name of the affiliation and with the respective portion of the first results presented in the first row;
    f. instructions for presenting in the view region a second plurality of rows in accordance with the second results, each row of the second plurality presenting a respective portion of the second results and presenting a respective third icon; and
    g. instructions for beginning an accounting of time presently being spent by the user in association with the respective portion of the second results presented in a second row of the second plurality of rows in response to receiving from the user via the browser an operation of the respective third icon of the second row of the second plurality of rows; wherein
    h. the database provides access by query to a plurality of email messages for the user and respective information for each affiliation; and
    i. each respective information includes a plurality of person records, a plurality of appointment records, a plurality of projects referring to a plurality of task records, and a plurality of account records wherein at least one account record is adjusted in accordance with the accounting of time.

2. The computer readable medium of claim 1 wherein a second limit of the first query is in accordance with the first icon.

3. The computer readable medium of claim 1 wherein the first text box comprises a text entry box having a drop down menu for supplying the name of the affiliation.

4. The computer readable medium of claim 1 wherein the second plurality of rows is appended to the first plurality of rows in the view region.

5. The computer readable medium of claim 1 wherein the third plurality of rows is appended to the second plurality of rows in the view region.

6. The computer readable medium of claim 1 wherein the second plurality of rows replaces the first plurality of rows in the view region.

* * * * *